(12) United States Patent
Snider

(10) Patent No.: US 8,332,340 B2
(45) Date of Patent: Dec. 11, 2012

(54) HYBRID MICROSCALE-NANOSCALE NEUROMORPHIC INTEGRATED CIRCUIT

(75) Inventor: Gregory S. Snider, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 426 days.

(21) Appl. No.: 12/743,781

(22) PCT Filed: May 22, 2008

(86) PCT No.: PCT/US2008/006592
§ 371 (c)(1),
(2), (4) Date: May 19, 2010

(87) PCT Pub. No.: WO2009/075694
PCT Pub. Date: Jun. 18, 2009

(65) Prior Publication Data
US 2010/0277232 A1    Nov. 4, 2010

Related U.S. Application Data

(60) Provisional application No. 60/992,663, filed on Dec. 5, 2007.

(51) Int. Cl.
*G06N 5/00* (2006.01)

(52) U.S. Cl. .......................... 706/38; 706/45

(58) Field of Classification Search .................... 706/38, 706/45
See application file for complete search history.

(56) References Cited

U.S. PATENT DOCUMENTS 5,376,813 A    12/1994 Delbruck et al.
5,781,648 A     7/1998 Sarpeshkar et al.

OTHER PUBLICATIONS

Laiho, et al., Memristive synapses are becoming reality, The Neuromorphic Engineer, 2010, pp. 1-3.*
ISA International Search Report and Written Opinion (PCT/US08/06592).

* cited by examiner

*Primary Examiner* — Wilbert L Starks

(57) ABSTRACT

Embodiments of the present invention include hybrid microscale-nanoscale neuromorphic integrated circuits that include an array of analog computational cells fabricated on an integrated-circuit-substrate. The analog electronic circuitry within each computational cell connected to one or more pins of a first type and to one or more pins of a second type that extend approximately vertically from the computational cells. The computational cells are additionally interconnected by one or more nanowire-interconnect layers, each nanowire-interconnect layer including two nanowire sublayers on either side of a memristive sublayer, with each nanowire in each nanowire sublayer of an interconnect layer connected to a single computational-cell pin and to a number of nanowires in the other nanowire sublayer of the interconnect layer.

15 Claims, 30 Drawing Sheets

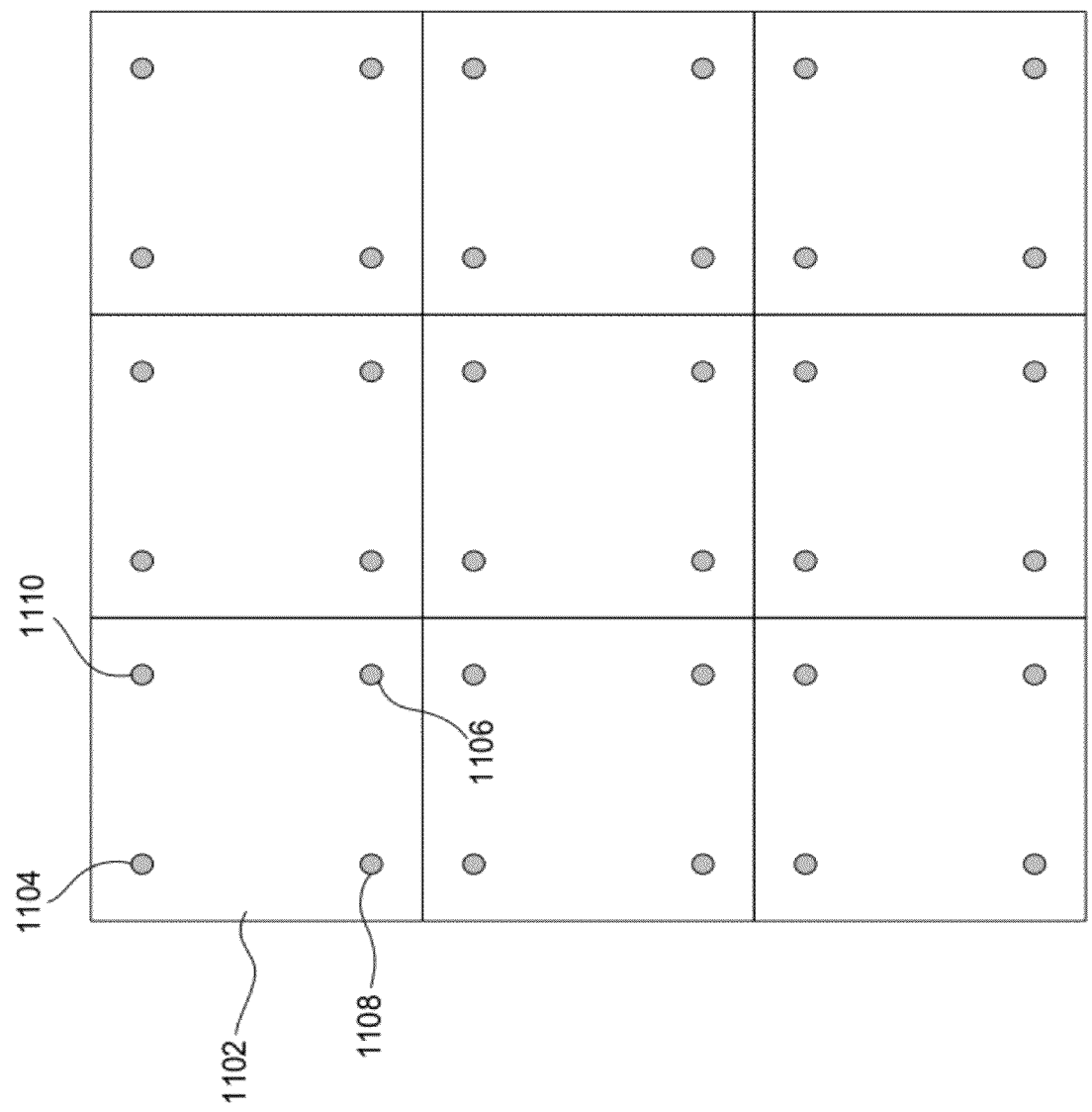

HYBRID MICROSCALE-NANOSCALE NEUROMORPHIC INTEGRATED CIRCUIT

CROSS-REFERENCE TO RELATED APPLICATION

This application claims the benefit of Provisional Application No. 60/992,663, filed Dec. 5, 2007.

TECHNICAL FIELD

The present invention is related to materials science and electronic-circuit implementations and, in particular, to a hybrid microscale-nanoscale integrated circuit architecture for implementing a large variety of different complex electronic circuits, processing systems, and computational devices, including neuromorphic circuits that mimic biological neurocircuitry.

BACKGROUND OF THE INVENTION

Current approaches to implementing microscale circuitry for computer processors, memory, and other computational machinery have led to spectacular, exponential increases in circuit density and computational power during the past half century. However, the steep, two-fold increase in processing power and feature density every two years that has characterized computer evolution for many years and that is referred to as "Moore's Law," has begun to flatten, with further decreases feature size now encountering physical limitations and practical constraints, including increasing electrical resistivity as signal lines diminish in size, increasing difficulty in removing heat from processors that produce increasing amounts of heat due to increases in the capacitance of features as feature sizes diminish, higher defect and failure rates in processor and memory components due to difficulties encountered in manufacturing ever smaller features, and difficulties in designing manufacturing facilities and methodologies to further decrease feature sizes. As further reductions in feature sizes within integrated circuits prove increasingly difficult, a variety of alternative approaches to increasing the computational power of integrated-circuit-based electronic devices have begun to be employed. As one example, processor vendors are producing multi-core processors that increase computational power by distributing computation over multiple cores that execute various tasks in parallel. Other efforts include fabricating circuitry at the nanoscale level, using various molecular electronics techniques, and addressing defect and reliability issues by applying theoretical approaches based on information science in similar fashion to the use of error-correcting codes to ameliorate faulty transmission of data signals through electronic communications media. Additional efforts are directed to developing nanoscale circuitry, referred to as "neuromorphic circuitry," that mimics biological neural circuitry that provides biological organisms with spectacularly efficient, low-power, parallel computational machinery. However, many current approaches employ conventional logic implemented in complementary metal oxide semiconductor ("CMOS") technologies to implement neuromorphic-circuitry-equivalents to synapses, severely limiting the density at which the neuromorphic-circuitry-equivalents to neurons can be fabricated, generally to a few thousand neurons per square centimeter of semiconductor-chip surface area. Researchers and developers of neuromorphic circuitry have thus recognized that, in order to produce sufficiently dense neuromorphic circuitry, new techniques and new architectures are needed.

SUMMARY OF THE INVENTION

Embodiments of the present invention include hybrid microscale-nanoscale neuromorphic integrated circuits that include an array of analog computational cells fabricated on an integrated-circuit-substrate. The analog electronic circuitry within each computational cell connected to one or more pins of a first type and to one or more pins of a second type that extend approximately vertically from the computational cells. The computational cells are additionally interconnected by one or more nanowire-interconnect layers, each nanowire-interconnect layer including two nanowire sublayers on either side of a memristive sublayer, with each nanowire in each nanowire sublayer of an interconnect layer connected to a single computational-cell pin and to a number of nanowires in the other nanowire sublayer of the interconnect layer. The microscale-nanoscale hybrid neuromorphic-circuit architecture of the present invention can be used to implement a very large number of different complex electronic circuits, computational systems, and computational devices, including neuromorphic laminar cortical circuits.

BRIEF DESCRIPTION OF THE DRAWINGS

FIGS. 11A-B illustrate interconnection of computational cells within a hybrid microscale-nanoscale neuromorphic integrated circuit that represents one embodiment of the present invention.

DETAILED DESCRIPTION OF THE INVENTION

Figure 1:
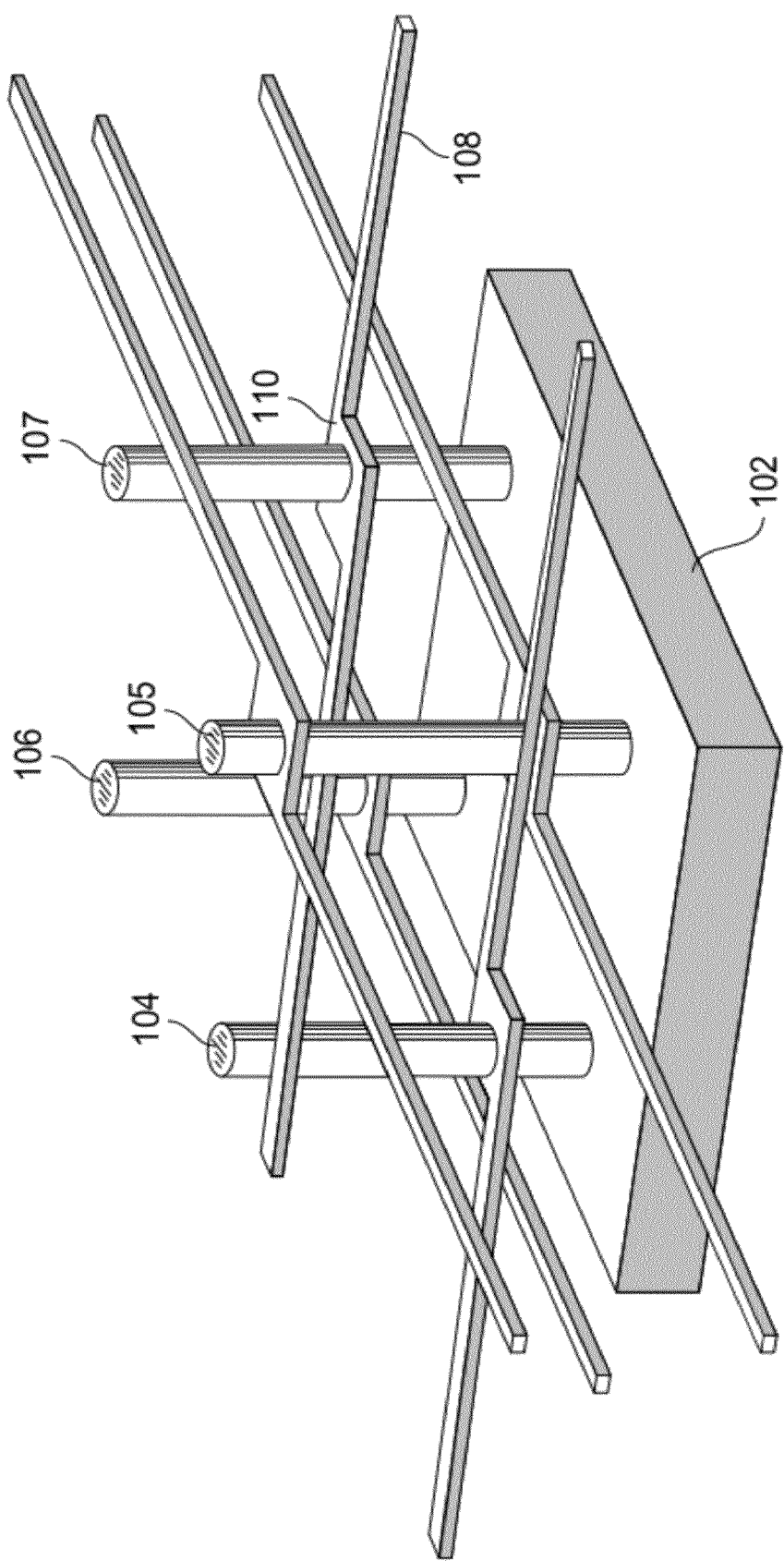
FIG. 1 shows a basic computational cell of a hybrid microscale-nanoscale neuromorphic integrated circuit that represents one embodiment of the present invention.

Embodiments of the present invention are directed to hybrid microscale-nanoscale neuromorphic integrated circuits that provide extremely dense, low-power-consuming analog neuromorphic circuitry for implementing an essentially limitless number of different electronic circuits, computational systems, and computational devices. The term "microscale" refers to microscale and submicroscale components and features, implemented in a silicon-based integrated-circuit layer or other semiconductor-substance based integrated-circuit layer by various techniques for producing integrated circuits, including photolithography, doping, etching, and linearization, having a smallest dimension of from a few micrometers down to between 10 and 100 nanometers. The term "nanoscale" refers to smaller features and components with smallest dimensions ranging from a few tens of nanometers down to less than 10 nanometers, implemented using various methods for producing nanowires and various nanowire structures, including nets and crossbars.

Biological neurocircuitry and neuromorphic electronic circuitry fabricated to emulate biological circuitry are based on neural cells and neuron computational units, respectively, interconnected with other neural cells units through synapses. The activity levels of neurons generally implement short-term memory, depression of neural excitation as a result of prolonged stimulus and other habituative responses generally implement medium-term memory, and synapse weights implement long-term memory. In general, in biological neurocircuitry, a given neuron may be interconnected through up to 10,000 or more synapses to other neurons. As mentioned above, attempts to fashion neuromorphic circuitry from microscale and submicroscale electronic components in integrated circuits have, so far, generally resulted in fairly low neuron densities, due to expenditure of a significant portion of the integrated circuit to simulating synapse functionality in submicroscale logic circuits. Because so many more synapses are needed than neurons, in many neuromorphic-integrated-circuit designs, a large portion of the surface of the neuromorphic integrated circuit is devoted to implementing a large number of synapse connections between a much smaller number of neurons.

Embodiments of the present invention provide high-neuron-density neuromorphic integrated circuits by implementing synapses as memristive junctions between nanowires. The synapses, and nanowire signal lines interconnected by synapses, mimic dendrites and axons of biological neurocircuitry and are fabricated within nanowire interconnection layers above the semiconductor-integrated-circuit layer, thus preserving the semiconductor-integrated-circuit surface for implementation of neuron computational cells, referred to as "neural cells" in the following discussion, and multi-computational-cell modules. Thus, hybrid microscale-nanoscale neuromorphic integrated circuits designed and fabricated according to the present invention employ memristic nanowire junctions, rather than logic circuitry, to implement synapses, and synapses and synapse-based interconnections between neural cells are implemented within nanowire interconnection layers above the semiconductor-integrated-circuit layer, providing vastly greater neural-cell density in a three-dimensional hybrid microscale-nanoscale neuromorphic-circuit architecture.

FIG. 1 shows a basic computational cell of a hybrid microscale-nanoscale neuromorphic integrated circuit that represents one embodiment of the present invention. The computational cell includes a regular area of a semiconductor-integrated-circuit layer 102 from which four conductive pins 104-107 extend vertically. Horizontal nanowires, such as nanowire 108 in FIG. 1, interconnect to the conductive pins through pad-like structures, such as pad-like structure 110, and extend linearly across a number of computational cells within a neighborhood of computational cell 102 in a two-dimensional array of computational cells of a hybrid microscale-nanoscale neuromorphic integrated circuit. As discussed further, below, the semiconductor-integrated-circuit layer of the computational cell 102 includes various interconnections and analog components that implement a model of a neuron or other fundamental computational device, certain of which are described below in greater detail. The four vertical pins 104-107 serve to interconnect the analog components and circuitry within the semiconductor-integrated-circuit-layer portion of the computational cell 102 to layers of nanowires, such as nanowire 108. The nanowires, in turn, may interconnect the computational cell to neighboring computational cells through nanowires and memristive junctions that model synapses.

Figure 2:
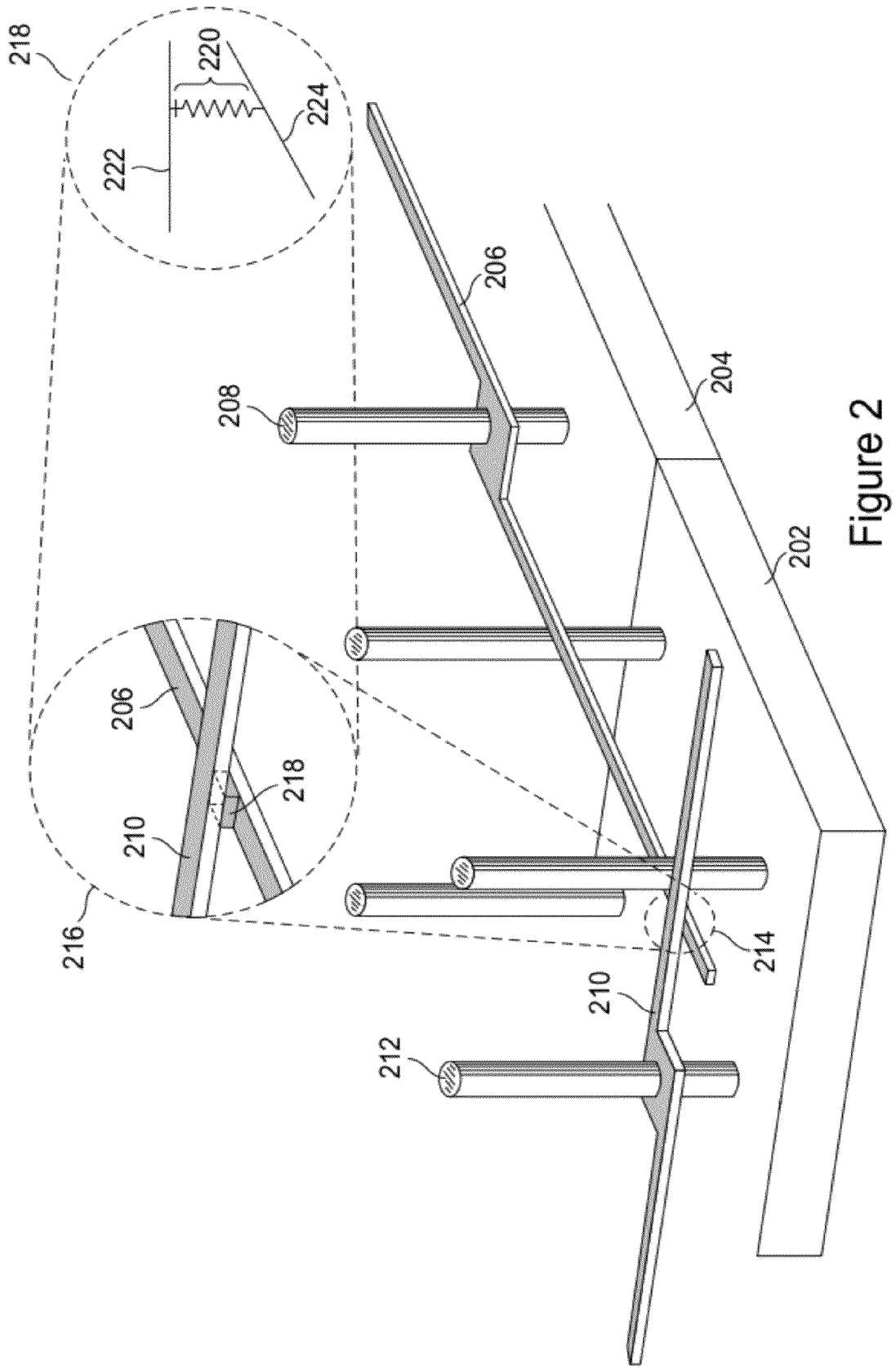
FIG. 2 illustrates a memristive junction between two nanowires that models synapse behavior in various embodiments of the present invention.

FIG. 2 illustrates a memristive junction between two nanowires that models synapse behavior in various embodiments of the present invention. In FIG. 2, a first computational cell 202 is shown to be positioned adjacently to a neighboring computational cell 204. A first nanowire 206 is connected to a vertical pin 208 of the adjacent, neighboring computational cell 204. A second nanowire 210 is electronically connected to a vertical pin 212 of computational cell 202, shown in the foreground of FIG. 2. The first nanowire 206 and second nanowire 210 overlap one another in the region demarcated by the small dashed circle 214 in FIG. 2, the overlap region magnified in the inset 216. There is a small layer of memoristic material 218 lying between the first nanowire 206 and second nanowire 210 that electronically interconnects the first nanowire with the second nanowire. The memoristic junction between the two nanowires can be symbolically represented, as shown in inset 218, by a memristor symbol 220 interconnecting two signal lines 222 and 224. As discussed further, below, each nanowire in an interconnection layer may interconnect with many different nanowires through memristive junctions.

Figure 3A:
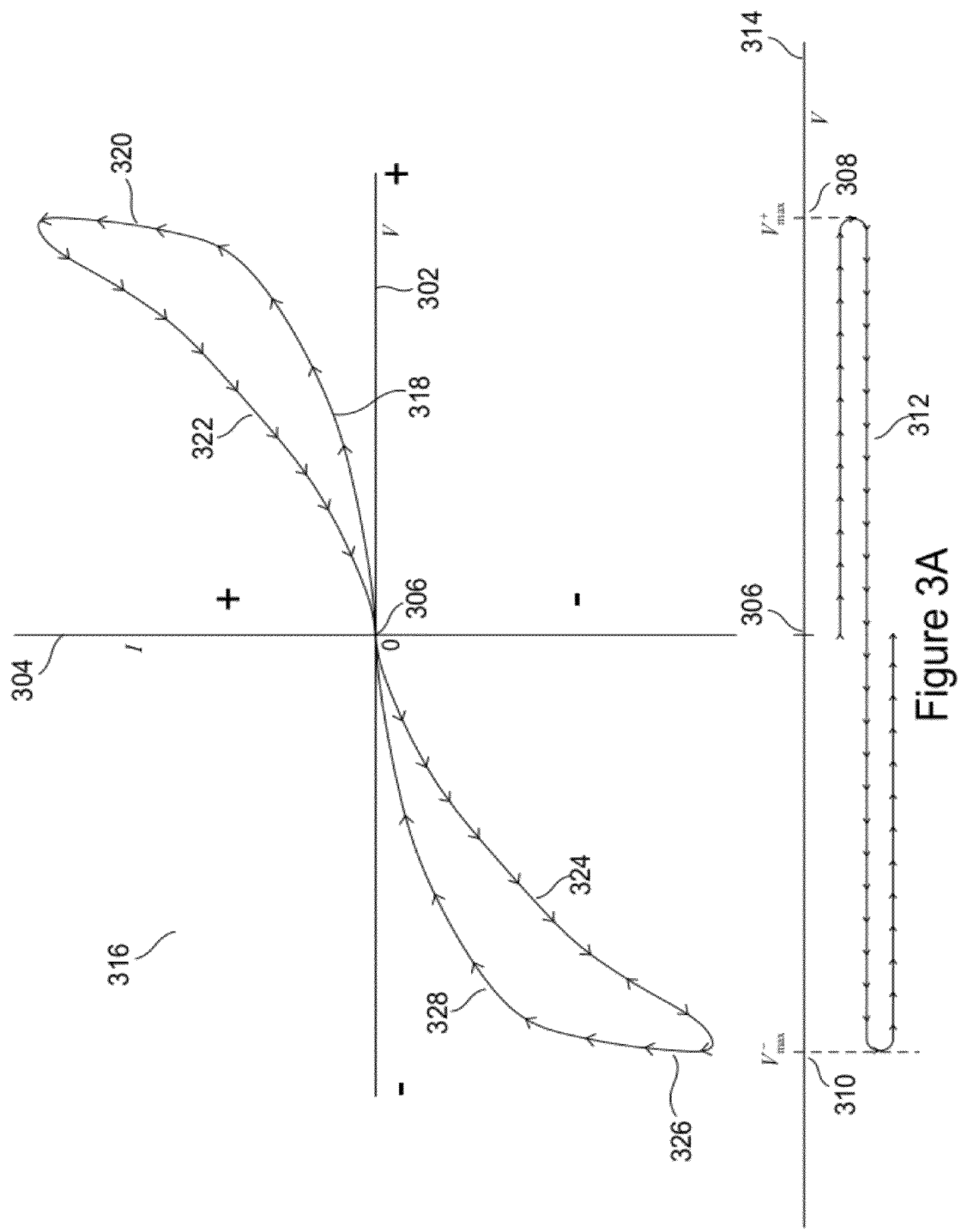
FIGS. 3A-B illustrate the essential electronic properties of memristive junctions employed to model synapses in various embodiments of the present invention.
Figure 3B:
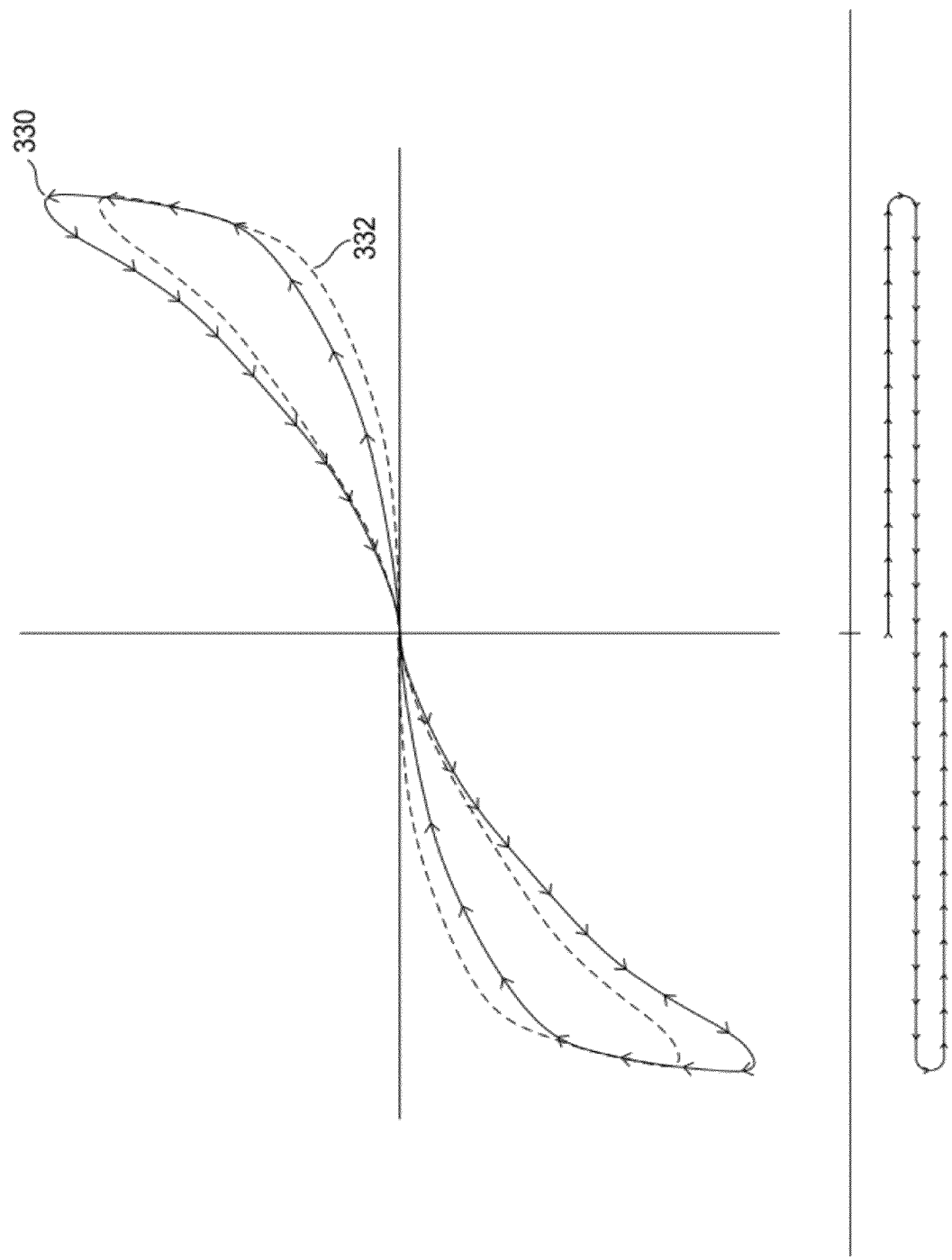

FIGS. 3A-B illustrate the essential electronic properties of memristive junctions employed to model synapses in various embodiments of the present invention. Both FIGS. 3A and 3B show current/voltage plots for a memristive junction. Voltage is plotted with respect to a horizontal axis 302 and current is plotted with respect to a vertical axis 304. A voltage sweep is illustrated in FIG. 3A. The continuous voltage changes that comprise the voltage sweep are represented by the voltage path 312 plotted with respect to a second voltage axis 314 in register with, and below, the current/voltage plot 316 in FIG. 3A. As shown in FIG. 3A, a voltage sweep is carried out by steadily increasing voltage from a voltage of zero 306 to a voltage $V_{max}^+$ 308, by then decreasing the voltage continuously to a negative voltage $V_{max}^-$ 310, and by then increasing the voltage back to 0 (306 in FIG. 3A). The current/voltage plot illustrates how the conductivity of the memristive material changes during the voltage sweep.

Initially, the memristive material is in a low conductivity state, so that the current remains relatively low, in magnitude, in a first portion of the plot 318 as voltage is increased from 0 (306 in FIG. 3A) to just below $V_{max}^+$ (308. Near $V_{max}^+$, the current begins to rapidly rise 320 as the resistance of the memristive material dramatically falls, or the conductivity increases, in a non-linear fashion. As the voltage is then decreased from $V_{max}^+$ down to $V_{max}^-$ 310, the conductivity of the memristive material remains high, as can be seen from the currents of relatively large magnitude passed by the memristive material for corresponding voltage values in portions of the plot 322 and 324. Near the negative voltage $V_{max}^-$, the conductance of the memristive material suddenly begins to decrease steeply 326. The memristive material is placed into a low conductance state, at $V_{max}^-$, that is retained as the voltage is again increased towards 0 (328 in FIG. 3A). As shown in FIG. 3B, a second voltage sweep 330 increases the conductance of the memristive material with respect to the conductance generated during the first voltage sweep, indicated by dashed lines 332. Additional voltage sweeps may further increase the conductance of the memristive material with respect to the conductance generated during the previous voltage sweep. Thus, the memristive material exhibits non-linearity in conductance under continuously increasing or decreasing applied voltage, and additionally exhibits a memory of previous conductance states. In other words, for various types of memristive materials used in embodiments of the present invention, the physical state of the memristive material w changes, with respect to time, as a function both of the current physical state of the memristive material and the applied voltage:

$$\frac{dw}{dt} = f(w, V).$$

The current i passed by a memristive junction in embodiments of the present invention is a function of the applied voltage and conductance of the material, where the conductance g is a function both of the current state of the memristive material and the applied voltage:

$i = g(w,v)V.$

As shown in FIGS. 3A-B, the conductance of the memristive junction depends on the currently applied voltage as well as on the history of applied voltages over a preceding time interval.

A synapse generally produces amplification or attenuation of a signal produced by a pre-synaptic neuron i and directed through the synapse to a post-synaptic neuron j. In certain models, the gain, or weight, of a synapse ranges from 0.0 to 1.0, with the gain 0.0 representing full attenuation of the signal and the gain 1.0 representing no attenuation of the signal. In these models, neurons have activities, and when the activity of a neuron i, $x_i$, is greater than a threshold value, the neuron emits an output signal. The mathematical model for neuron behavior is provided in a subsequent paragraph. One mathematical model for the rate of change of gain $z_{ij}$ for a synapse that interconnects a pre-synaptic neuron i with a post-synaptic neuron j is expressed as:

$$\frac{dz_{ij}}{dt} = \varepsilon f((x_j)(-\omega z_{ij} + g(x_i)))$$

where
$z_{ij}$ is the weight of, or gain produced by, the synapse ij interconnecting pre-synaptic neuron i with post-synaptic neuron j;
$\varepsilon$ is a learning rate;
$\omega$ is a forgetting rate;
$f(x_j)$ is non-linear function of the activity of neuron i;
$g(x_i)$ is non-linear function of the activity of neuron j; and
t is time.

In many embodiments of the present invention, f( ) and g( ) are generally sigmoidal. One exemplary sigmoidal, or "S" shaped, function is tanh( ). When the pre-synaptic neuron and post-synaptic neuron both have high activities, the gain $z_{ij}$ rapidly increases. The term $-\omega z_{ij}$, ensures that the gain of a synapse decreases, over time, when the term $-\omega z_{ij}$ has a magnitude greater than the current values of the non-linear function of the activity of the post-synaptic neuron $g(x_i)$. The weight of a synapse cannot increase or decrease in unbounded fashion, due to feedback term $-\omega z_{ij}$, which acts to decrease the weight of the synapse as the synapse weight of the synapse approaches 1.0, and which produces less and less feedback as the weight of the synapse approaches 0.0. The mathematical model for synapse behavior depends on the mathematical model for neuron activity, and the models provide mutual feedback to one another. As can be seen by comparing the mathematical model for synapse gain to the above expressions describing conductivity changes of a memristive junction, in particular, the conductance function g(w,v), the conductance of a memristive junction may provide a physical embodiment of a gain function, the time derivative of which is expressed as the above mathematical model, since the non-linear functions of neuron activities $f(x_i)$ and $g(x_i)$ of the synapse model are related to the to physical voltage between neurons and the gain, $z_{ij}$, at a given point in time is related to the history of voltages applied to the memristive junction. The functional expression for conductance of a memristive nanowire junction thus depends on the current activities of pre-synaptic and post-synaptic neurons connected by the memristive nanowire junction as well as the recent applied-voltage history of the memristive nanowire junction. Thus, in various embodiments of the present invention, memristive nanowire junctions interconnecting nanowires provide physical characteristics for passing current signals suitable for modeling synapse behavior as expressed by the above mathematical model.

Figure 4:
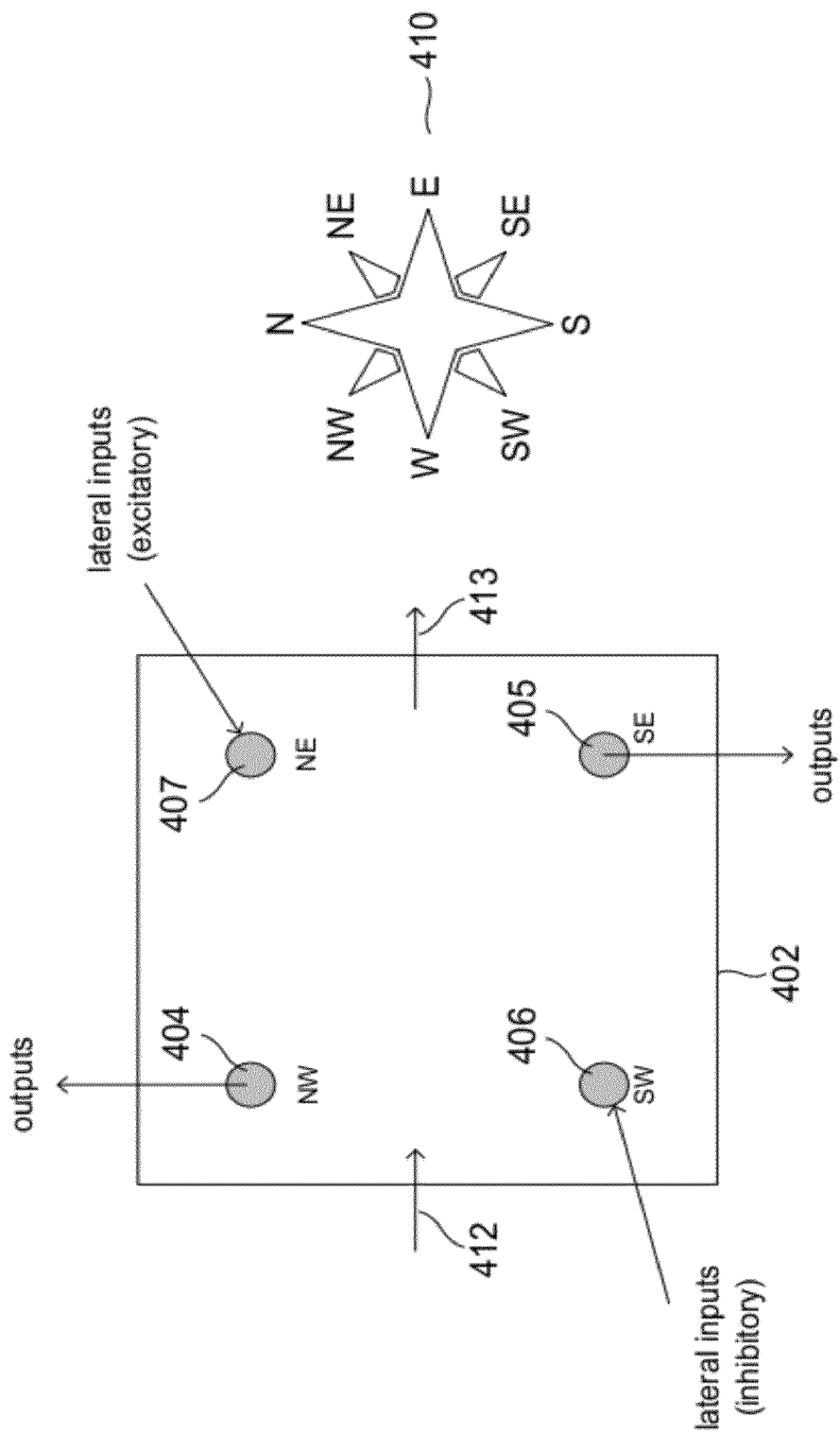
FIG. 4 shows a neural cell that serves as a basic computational unit in various embodiments of a hybrid microscale-nanoscale neuromorphic integrated circuit of the present invention.

FIG. 4 shows a neural cell that serves as a basic computational unit in various embodiments of a hybrid microscale-nanoscale neuromorphic integrated circuit of the present invention. A neural cell is one type computational cell within a hybrid microscale-nanoscale neuromorphic integrated circuit. As discussed above, the neural cell 402 includes four vertical-conductive pins 404-407. The pins are referred to by their compass directions, with a compass diagram 410 shown to the right of the computational cell in FIG. 4. The NW pin 404 and SE pin 405 conduct output signals from the neural cell to nanowires interconnected with NW pin 404 and SE pin 405. The SW pin 406 and the NE pin 407 both conduct signals, input to the pins from nanowires connected to the pins, to the neural cell 402. The SW pin 406 conducts inhibitory signals into the neural cell, while the NE pin 407 conducts excitatory input signals into the neural cell. Excitatory input signals tend to increase the activity of a neural cell, while inhibitory signals tend to decrease the activity of a neural cell.

The basic neural cell 402 shown in FIG. 4 generally implements one of numerous different mathematical models for a neuron. In general, when the frequency and number of received excitatory signal significantly exceeds the frequency and number of inhibitory signals, the activity of a neuron generally increases above a threshold activity value, at which point the neuron emits output signals through output pins 404 and 405.

The input excitatory signals and input inhibitory signals are received through synapse-like memristive nanowire junctions from other neural cells of a hybrid microscale-nanoscale neuromorphic integrated circuit, and output signals emitted by the neural cell 402 are directed through synapse-like memristive nanowire junctions to other computational cells of a hybrid microscale-nanoscale neuromorphic integrated circuit. Neural cells and neuromorphic circuits generally include various feedback mechanisms and exhibit non-linear behavior that control and constrain the activities of individual neural cells within a neuromorphic circuit. Even modestly-size neuromorphic circuits containing only a relatively small number of neural cells densely interconnected through synapses can exhibit quite complex functionality that often cannot be modeled using closed-form mathematical expressions and that would be difficult to implement in traditional Boolean-logic-based digital logic circuits. In FIG. 4, input 412 and output 412 indicate that, in addition to receiving signals and transmitting signals through the four vertical pins, a neural cell can all interconnect with adjacent computational cells through additional microscale or submicroscale signal lines implemented within the semiconductor-integrated-circuit level of a hybrid microscale-nanoscale neuromorphic integrated circuit.

FIGS. 5A-E illustrate the internal operation of one easily illustrated neural cell that represents an embodiment of the present invention. As shown in 5A, all of the excitatory inputs, such as excitatory input 502, to the NE input pin (407 in FIG. 4) are summed together by a summing operation 504. Similarly, all of the inhibitory input signals, such as inhibitory input signal 506, are summed together by a similar summing function 508. Additional inputs from the semiconductor-integrated-circuit layer, such as input 412 in FIG. 4, may be included in the summing operation, or may be input to functional components that implement later stages of neural-cell processing. The summing components 504 and 508 may simply be input pins to which input nanowire signal lines are connected, or may include amplifying components are other electronic components. The sum of the excitatory signals and the sum of the inhibitory signals are then input to a signal-generating functional component 510 that generates an analog voltage signal, represented by the signal/time plot 512 in FIG. 5A.

Figure 5A:
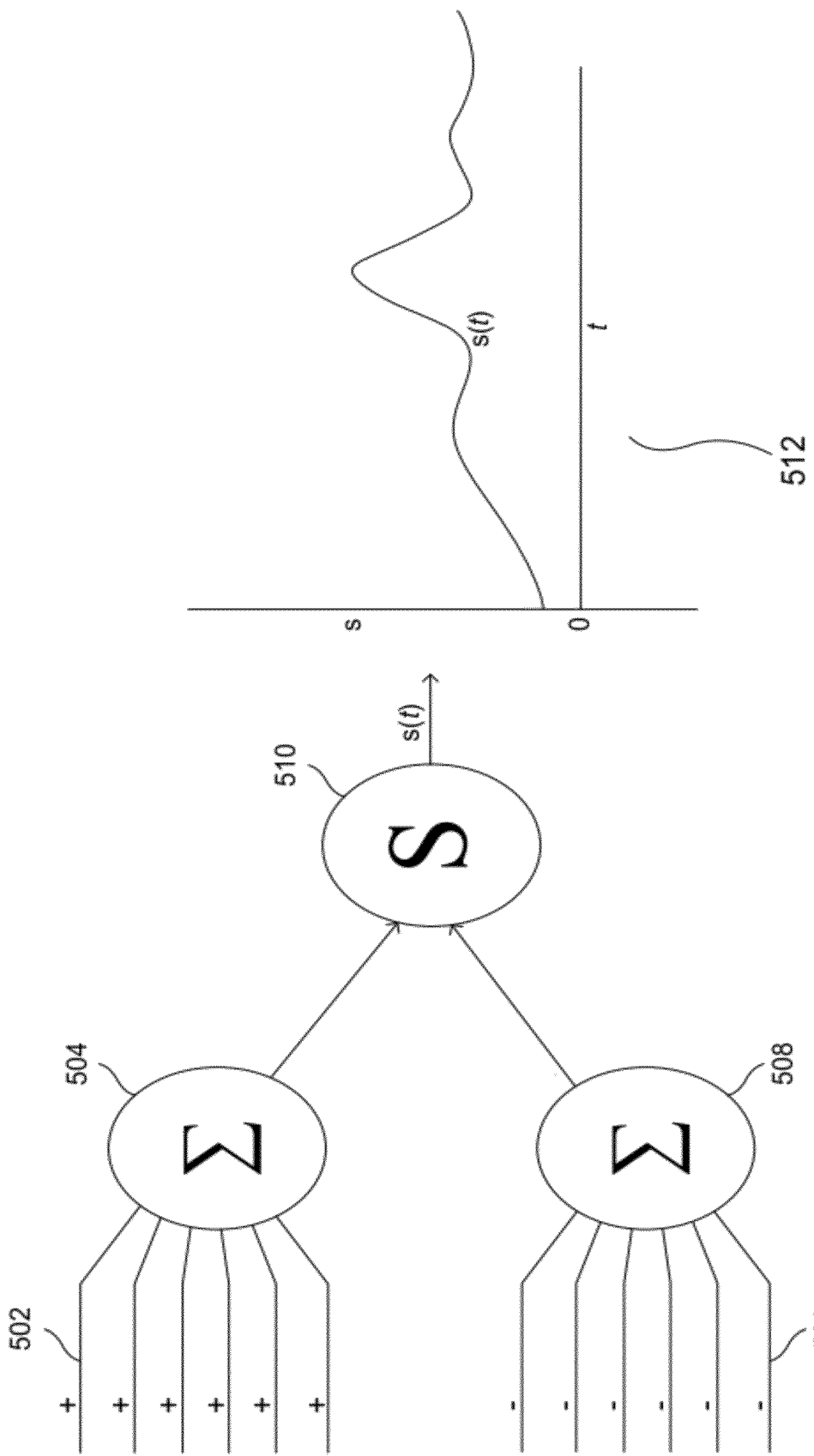
FIGS. 5A-E illustrate the internal operation of one easily illustrated neural cell that represents an embodiment of the present invention.
Figure 5B:
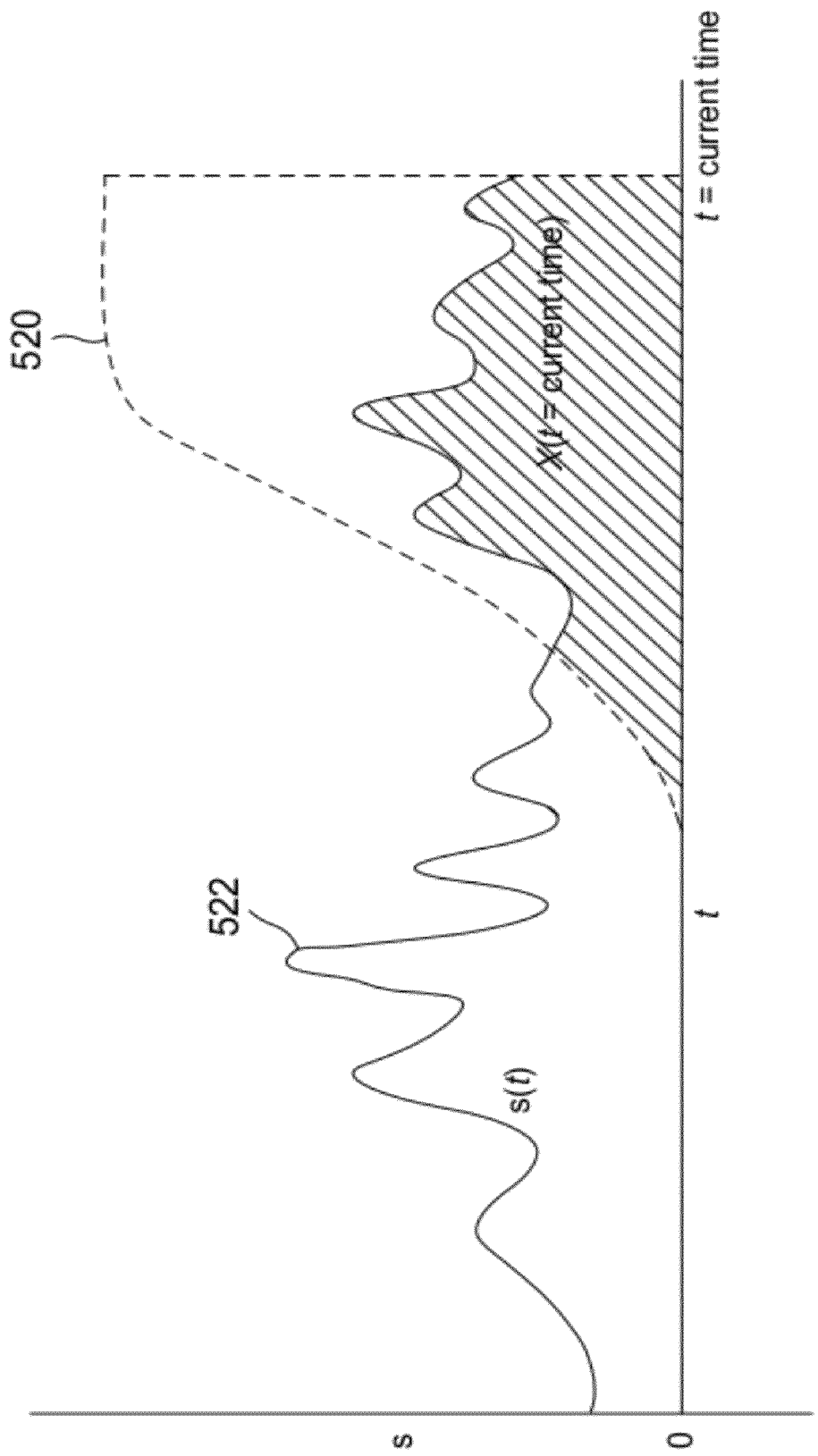

As shown in FIG. 5B, the exemplary neural cell includes a leaky-integrator functional component that continuously integrates the signal produced by the signal-generating function or operation (shown in FIG. 5A), for some time interval preceding and including the current time. As shown in FIG. 5B, the leaky integration can be viewed as superimposing a time-window function 520 over the analog signal 522 and integrating that portion of the analog signal below the time-window function 520. In FIG. 5B, and in subsequent figures, the analog signal is shown to be uniformly positive, in value, for simplicity of illustration, but, in fact, the analog signal may be either positive, 0, or negative.

Figure 5C:
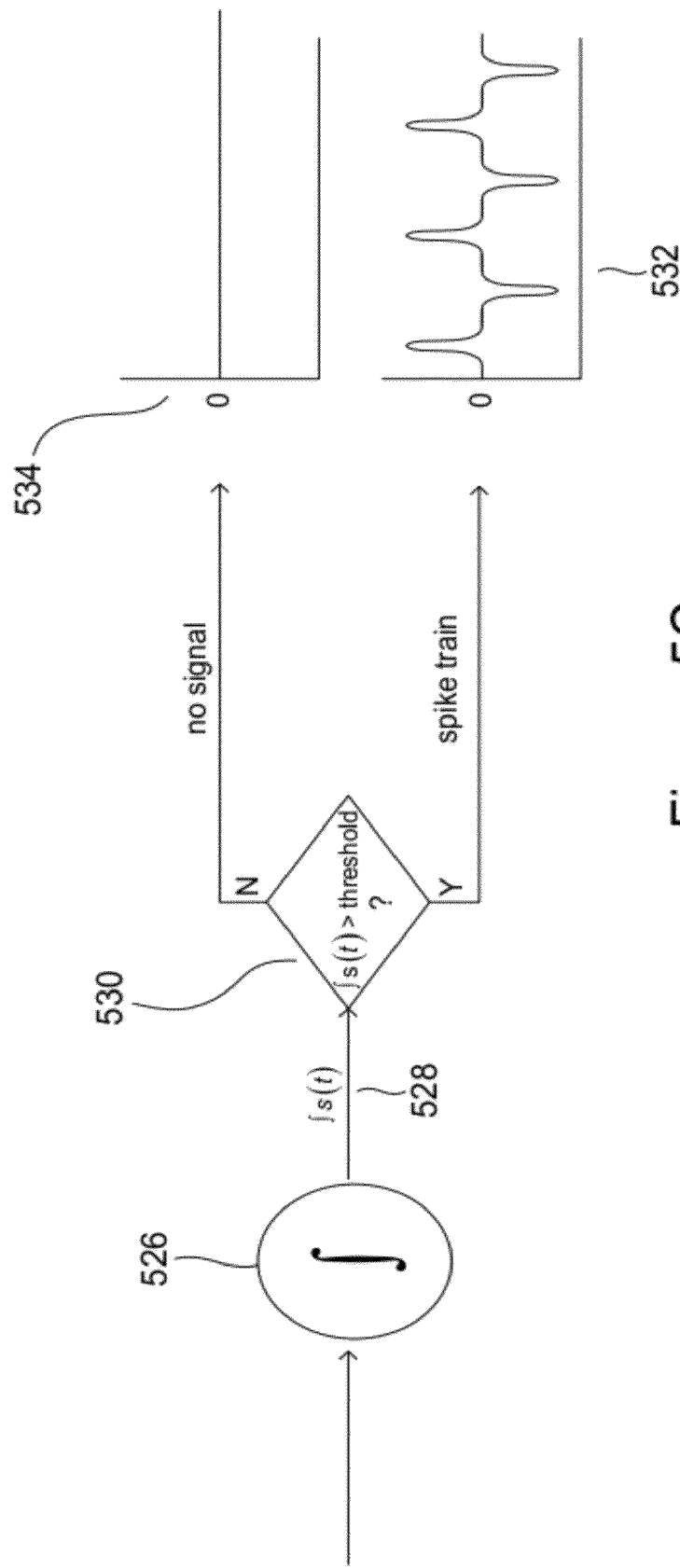

As shown in FIG. 5C, the leaky-integration functional component outputs an integrated signal 528 to a thresholding functional component 530. When the integrated signal has a value greater than a threshold value, as determined by the thresholding functional component, the neural cell emits an output signal, shown as a spike train 532 in FIG. 5C. Otherwise, the neural cell emits no signal, as indicated by a plot of a constant-0 function 534 in FIG. 5C. The thresholding functional component can be considered to activate an output-signal-generation component, or, alternatively, to include an output-signal-generation component.

Figure 5D:
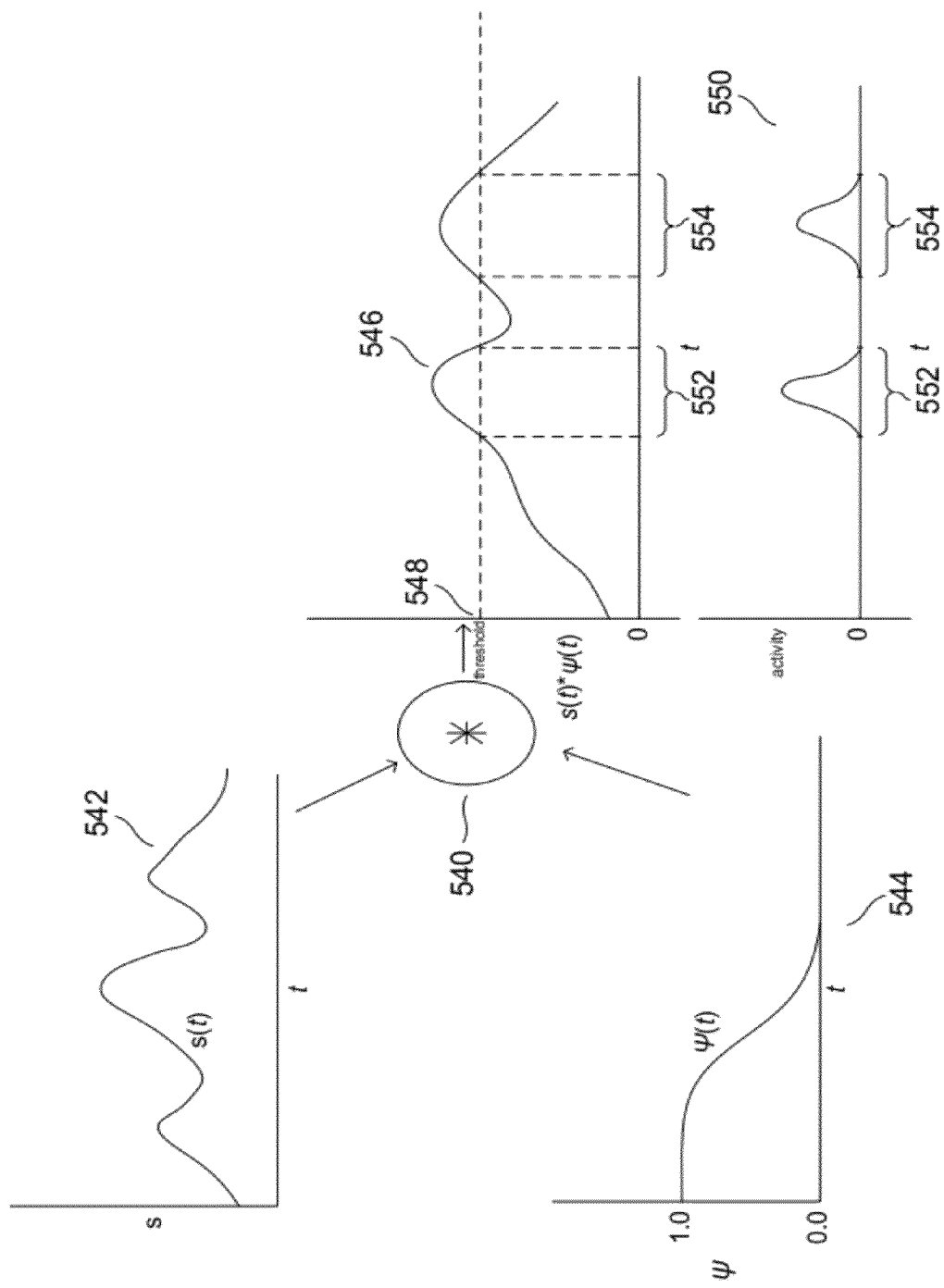

Operation of a neural cell can be alternatively considered, as shown in FIG. 5D, as a convolution operation 540 on the analog signal 542 and a time-window function $\Psi$ 544 to produce the convolved function 546. A threshold 548 is then superimposed on the convolved function 546, or the convolved function is translated downward by a threshold distance, to produce a corresponding activity function 550. Thus, during the time intervals in which leaky integration of the input signal produces a value above a threshold value, such as time intervals 552 and 554, the neural cell is active, as shown by the neural-cell activity plot 550 in FIG. 5D.

Figure 5E:
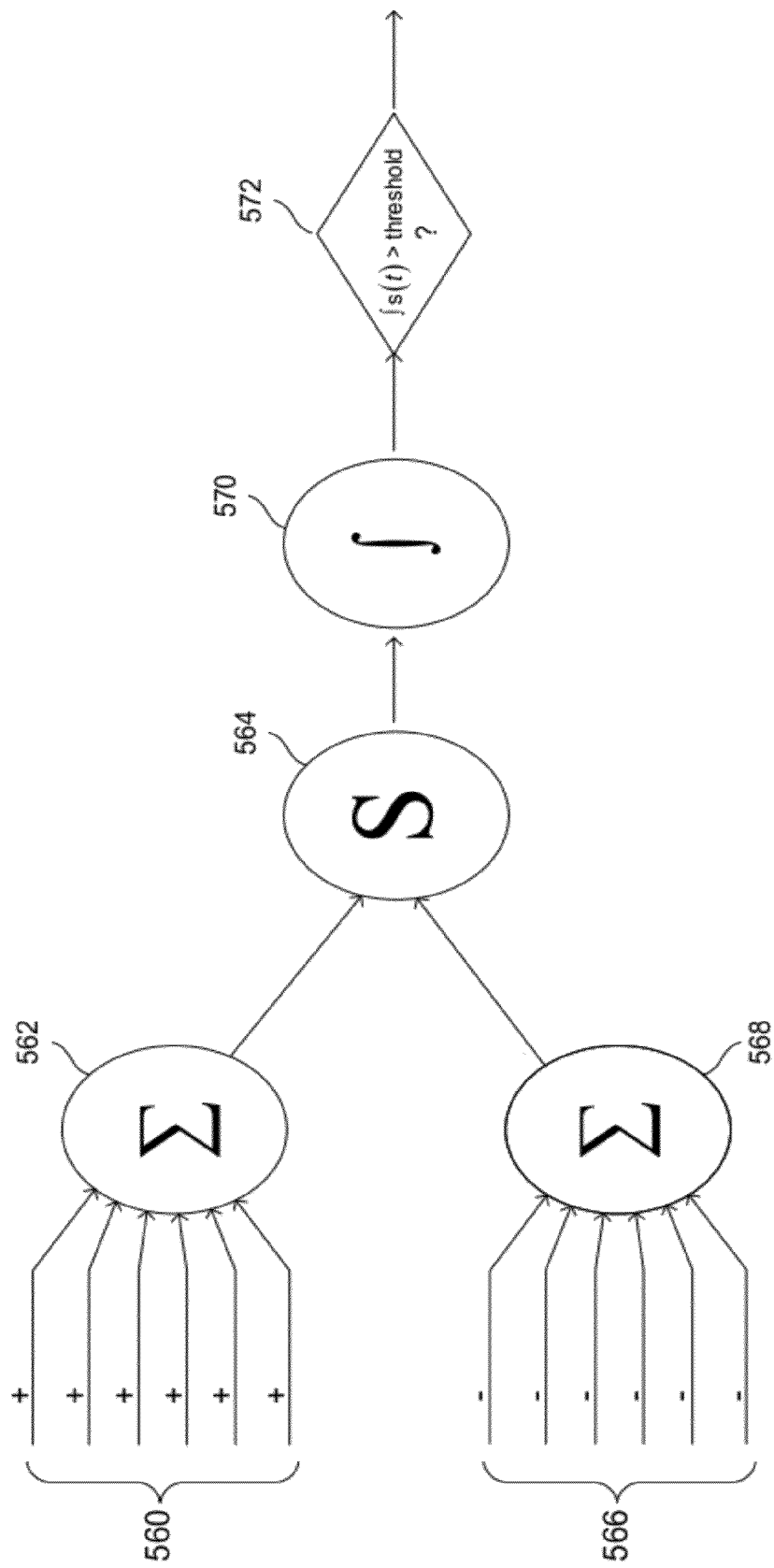

FIG. 5E summarizes internal operation of a neural cell according to various embodiments of the present invention. Excitatory inputs 560 are summed together 562 and input to a signal-generating function 564. Similarly, inhibitory signals 566 are summed together by a summing function 568 and input to the signal-producing function 564. The signal-producing operation may generate an analog signal based on the combined, summed inputs according to any of various mathematical models for neuron behavior. For example, the signal-producing function may apply a non-linear function to both the summed excitatory input signals and the summed inhibitory input signals, and then linearly combine the results of application of the non-linear functions. The signal-producing function 564 outputs an analog signal to a leaky-integrator function 570 which outputs an integrated signal over a preceding time interval to a thresholding function 572 which determines whether or not the neural cell is sufficiently active to emit an output signal.

As discussed below, leaky integration is a special case of neural circuitry, and is shown in the examples of FIGS. 5A-E as an example neural circuit because it is relatively easy to illustrate. Additional, more functionally powerful and flexible neuron-circuitry may be employed, including circuitry that implements a Hodgkin-Huxley neuron model, and a shunting model, discussed below. It should be emphasized that, in these more functionally powerful and flexible neural circuits, a thresholding component may not be needed. A thresholder is useful when spike trains are generated, in certain neuromorphic circuits, as signals between neurons, but, in other models, signal spikes may be generated without thresholding components, or, alternatively, signals may be more continuous, rather than comprise spike trains.

Figure 6:
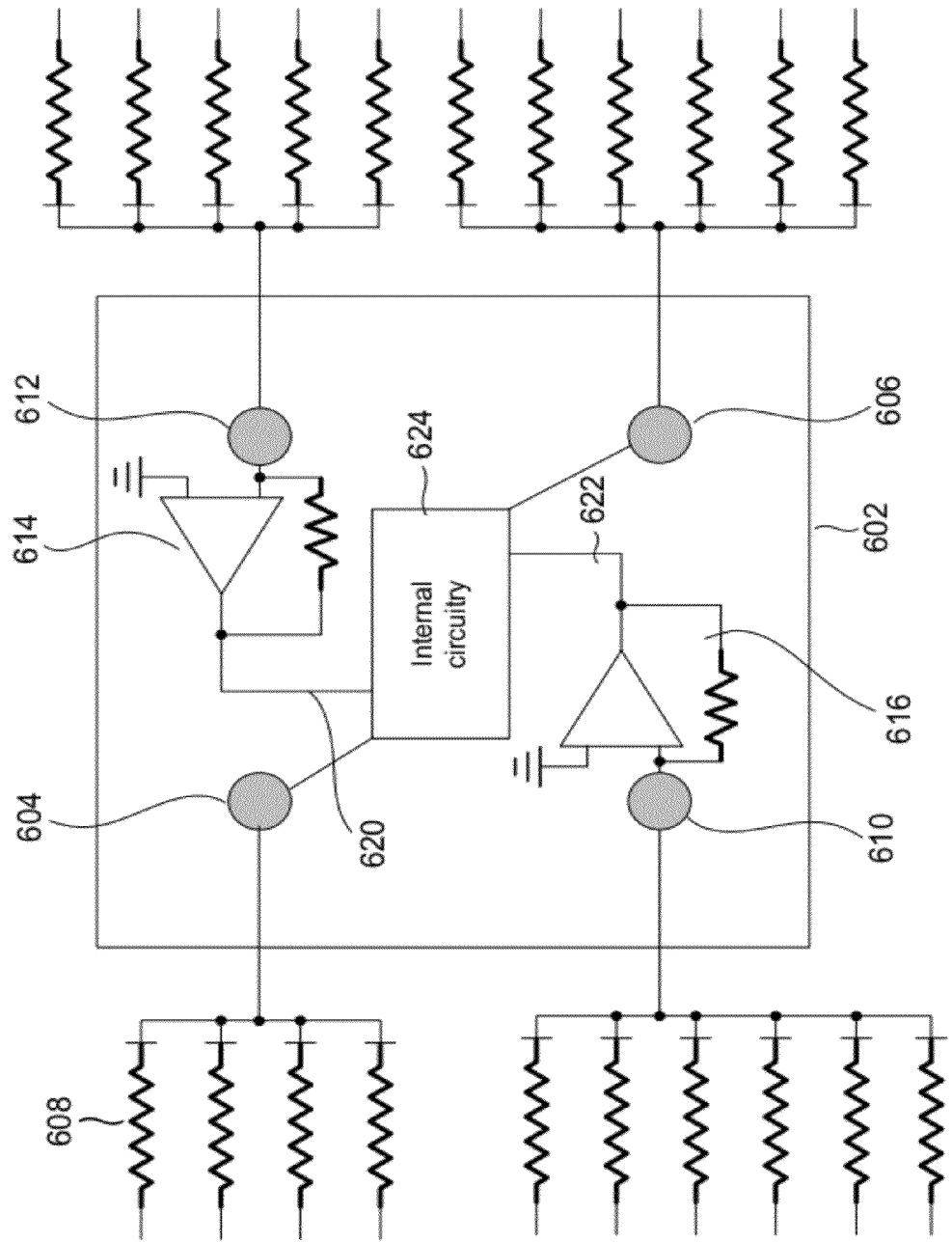
FIG. 6 illustrates the general internal circuitry of a neural cell according to various embodiments of the present invention.

FIG. 6 illustrates the general internal circuitry of a neural cell according to various embodiments of the present invention. The neural cell 602 outputs signals via output pins 604 and 606 to neighboring computational cells of a neuromorphic circuit through memristive, synapse-like nanowire junctions represented by the memristor symbols, such as memristor symbol 608. The neural cell receives inhibitory signals through a first input pin 610 and excitatory signals through a second input pin 612. The assignment of pins to output signals, inhibitory input signals, and excitatory input signals in FIG. 6 is identical to that discussed with reference to FIG. 4, although different assignments may be made in alternative embodiments, and a given hybrid microscale-nanoscale neuromorphic integrated circuit may employ various different pin assignments for computational cells. In the neural cell shown ion FIG. 6, simple op-amp-based summing circuits 614 and 616 are used to sum the excitatory input signals and inhibitory input signals to produce a summed-excitatory-signal input signal 620 and a summed inhibitory signal input signal 622 that are input to the internal circuitry of the neural cell 624 which implements the signal-producing, integration, and thresholding functions discussed above with reference to FIGS. 5A-E. The exact nature of the circuits employed for leaky integration, signal synthesis, and thresholding depends on the nature of input signals received by the neural cell and on an exact mathematical model implemented by the neural cell. For example, an op-amp-and-capacitor-based integration circuit may be employed for leaky integration and various types of op-amp-based summing circuits may be used to linearly combine the two summed input signals 620 and 622 for signal synthesis.

There are various different types of mathematical models for neural cells. In any given neuromorphic circuit, several different types of neural cells that implement different mathematical models of neurons may be employed in order to properly emulate or implement a desired high-level functionality. One mathematical model for a neural cell can be expressed as:

$$\frac{dx_i}{dt} = -Ax_i + (B - x_i)\left[\sum_{j=1}^{n} f_j(x_j)z_{ji}\right] - x_i\left[\sum_{j=1}^{m} g_j(x_j)z_{ji}\right]$$

where
i is the modeled neuron;
$x_i$ is the activity of neuron i;
t is time;
$f_j(x_j)$ is a non-linear function of the activity of neuron j;
$z_{ji}$ is weight of synapse between neurons j and i;
$g_j$ is a non-linear function of the activity of neuron j;
n is the number of neuron linked to node i through excitatory inputs;
m is number of neurons linked to node i through inhibitory inputs; and
A and B are constants.
In this model, the activity of a particular neural cell, i, is a linear combination of a first passive decay term, $-Ax_i$, a second term reflecting the sum of excitatory inputs modified by a feedback term, $$(B - x_i)\left[\sum_{j=1}^{n} f_j(x_j)z_{ji}\right],$$

and a third term reflecting the sum of the inhibitory inputs modified by a feedback term, $$-x_i\left[\sum_{j=1}^{m} g_j(x_j)z_{ji}\right].$$

In this model, the activity of a neuron i, $x_i$, ranges from 0.0 to 1.0. When the neuron activity is high, approaching 1.0, feedback terms in the equation serve to limit further increase in activity and force the activity downward. On the other hand, when the activity of the neuron i, $x_i$, is low, near 0.0, then the feedback terms decrease in significance, and the neural cell responds with high sensitivity to excitatory inputs and low sensitivity to inhibitory inputs, thus increasing the activity of the neural cell. As discussed above, when the activity of a neural cell rises above a threshold value, the neural cell emits output signals through synapse-like memristive nanowire junctions to neighboring computational cells, and may also output signals through semiconductor-integrated-circuit-layer signal lines to adjacent computational cells. As discussed above, many different possible mathematical models for neural cell operation are possible, and many different models may be employed within a single neuromorphic circuit, with neural cells at different logical levels within a hierarchical neuromorphic circuit implementing different mathematical models of neural-cell behavior.

Figure 7:
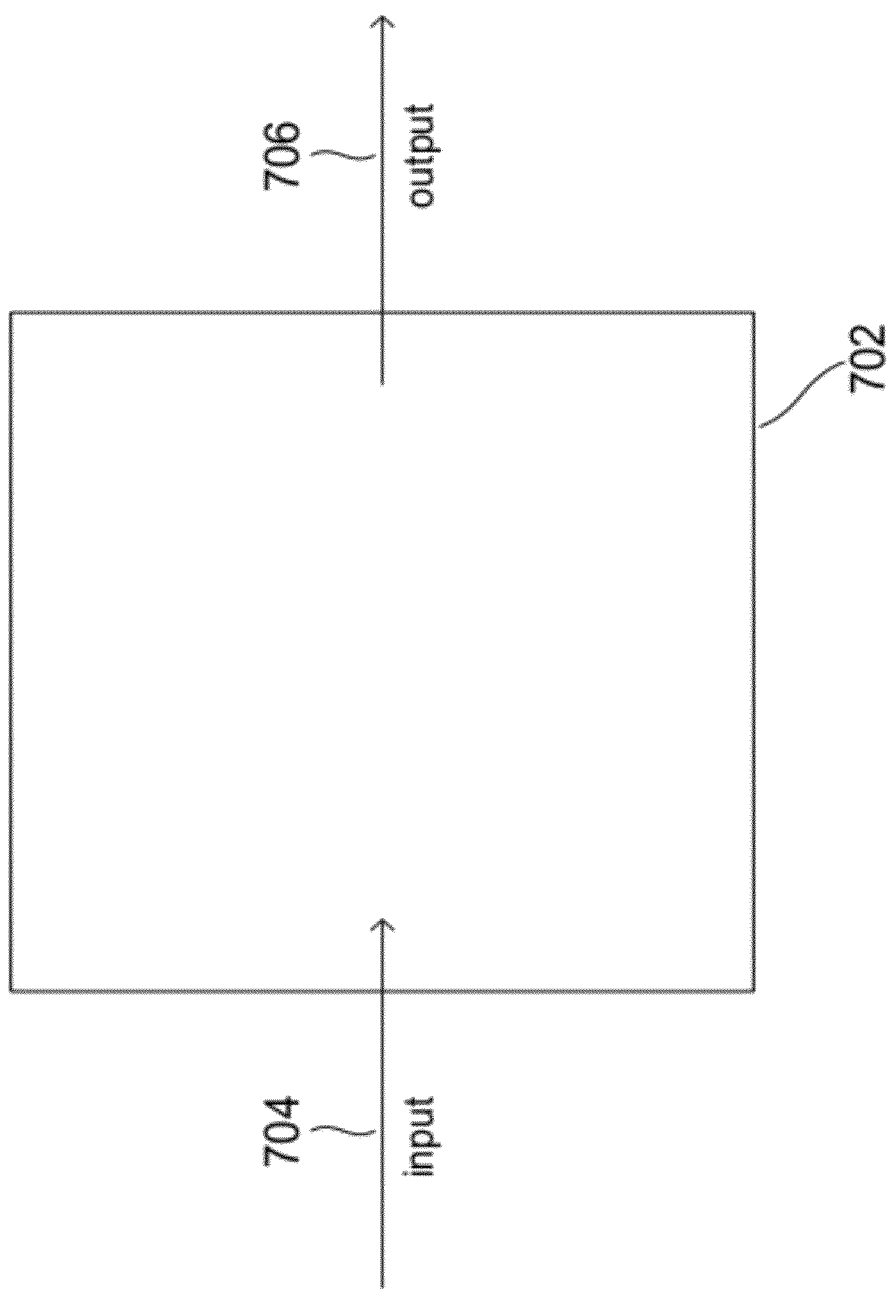
FIG. 7 shows a habituative-transmission-gate computational cell employed within hybrid microscale-nanoscale neuromorphic integrated circuits that represent embodiments of the present invention.
Figure 8:
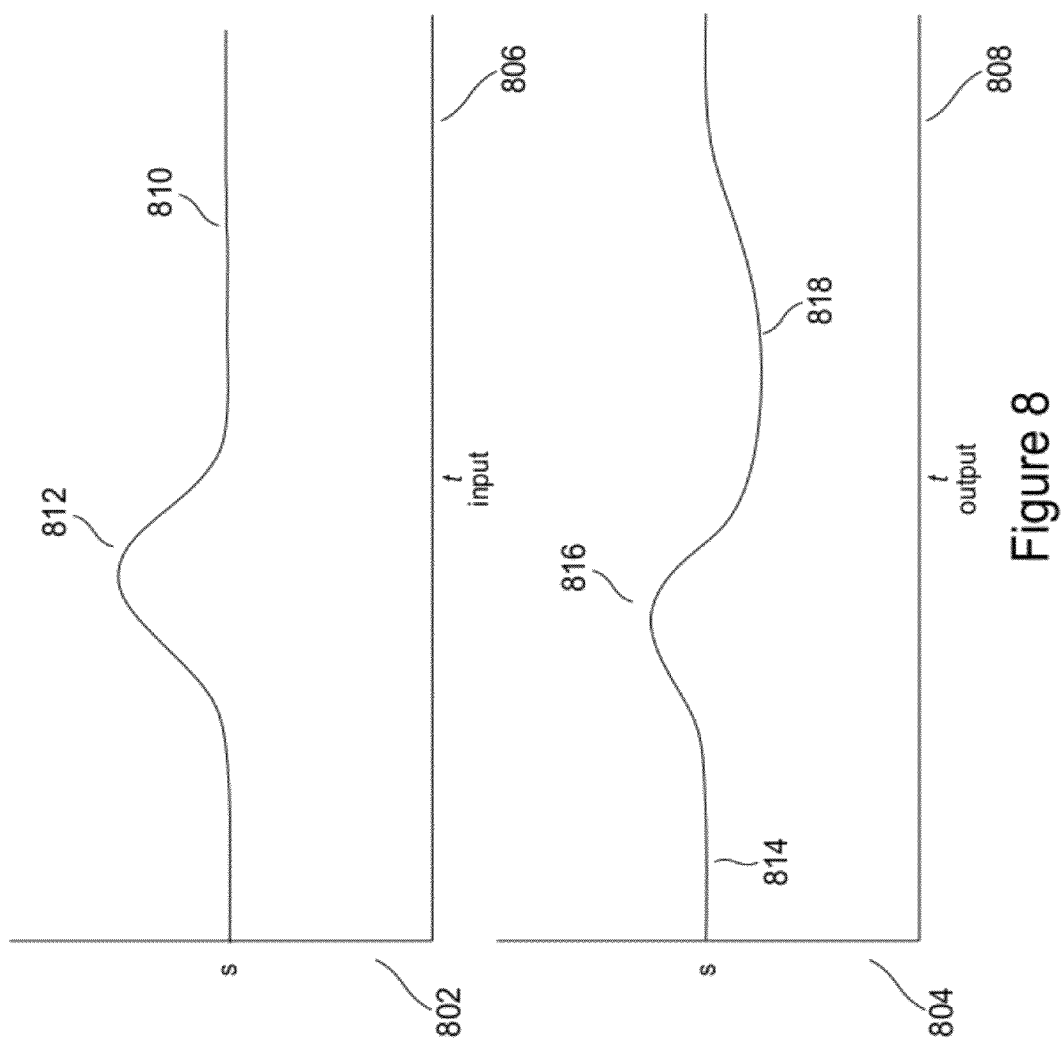
FIG. 8 illustrates modification by a habituative-transmission-gate computational cell of an input signal according to one embodiment of the present invention.

FIG. 7 shows a habituative-transmission-gate computational cell employed within hybrid microscale-nanoscale neuromorphic integrated circuits that represent embodiments of the present invention. A habituative-transmitter-gate cell ("HTG"), as shown in FIG. 7, does not employ the vertical pins used to connect neural cells to other neural cells through synapse-like memristive nanowire junctions. Instead, an HTG 702 receives input 704 from, and produces output 706 to, adjacent computational cells in a neuromorphic circuit through semiconductor-integrated-circuit signal lines. An HTG produces a relatively longer-duration effect on input signals than those produced by neural cells in response to inhibitory and excitatory inputs. FIG. 8 illustrates modification by a habituative-transmission-gate computational cell of an input signal according to one embodiment of the present invention. In FIG. 8, the input signal is plotted in a first plot of signal strength versus time 802, and the corresponding output signal is plotted in a second plot of signal strength versus time 804. The two plots in FIG. 8 are aligned with respect to the time axes 806 and 808, respectively. When the input signal 810 includes a positive voltage peak 812, the output signal 814 also includes a positive voltage peak 816 corresponding to the positive voltage peak 812 in the input signal. However, in the output signal, the voltage generally peaks at a significantly lower voltage and then falls to a negative voltage 818 over a period of time subsequent to the positive voltage peak. An HTG models the biological neural-circuitry principle that post-synaptic neurons are initially sensitive to excitatory input, but the sensitivity of post-synaptic neurons rapidly diminishes with prolonged excitatory input.

One possible mathematical model for an HTG is next provided:

$$\frac{dz_i}{dt} = A(1 - z_i) - Bf[T(y_i)]z_i$$

where
- $z_i$ is gain applied by the habituative transmitter gate to an input signal;
- t is time;
- $y_i$ is input to habituative transmitter gate;
- T is a rectification function;
- $f([T(y_i)])$ is a non-linear function of the rectified input; and
- A and B are constants.

In this equation, $z_i$ is the gain applied to the output signal of an HTG cell relative to the input signal. In this model, the gain ranges from 0.0 to 1.0. The first term, $A(1-z_i)$, provides relatively long-term restoration of the gain of an HTG, while the second term, $-Bf[T(y_i)]z_i$, provides rapid output-signal attenuation and a subsequent, longer-duration negative signal when a positive signal is input to the HTG. In any particular neuromorphic integrated circuit representing one embodiment of the present invention, the particular mathematical model employed for any given HTG may differ, in the values of the constants A and B, or in the overall mathematical formula for the HTG. In general, however, HTG cells are employed to dampen the effects of prolonged excitatory or inhibitory signals output by, or received by, neural cells.

Figure 9:
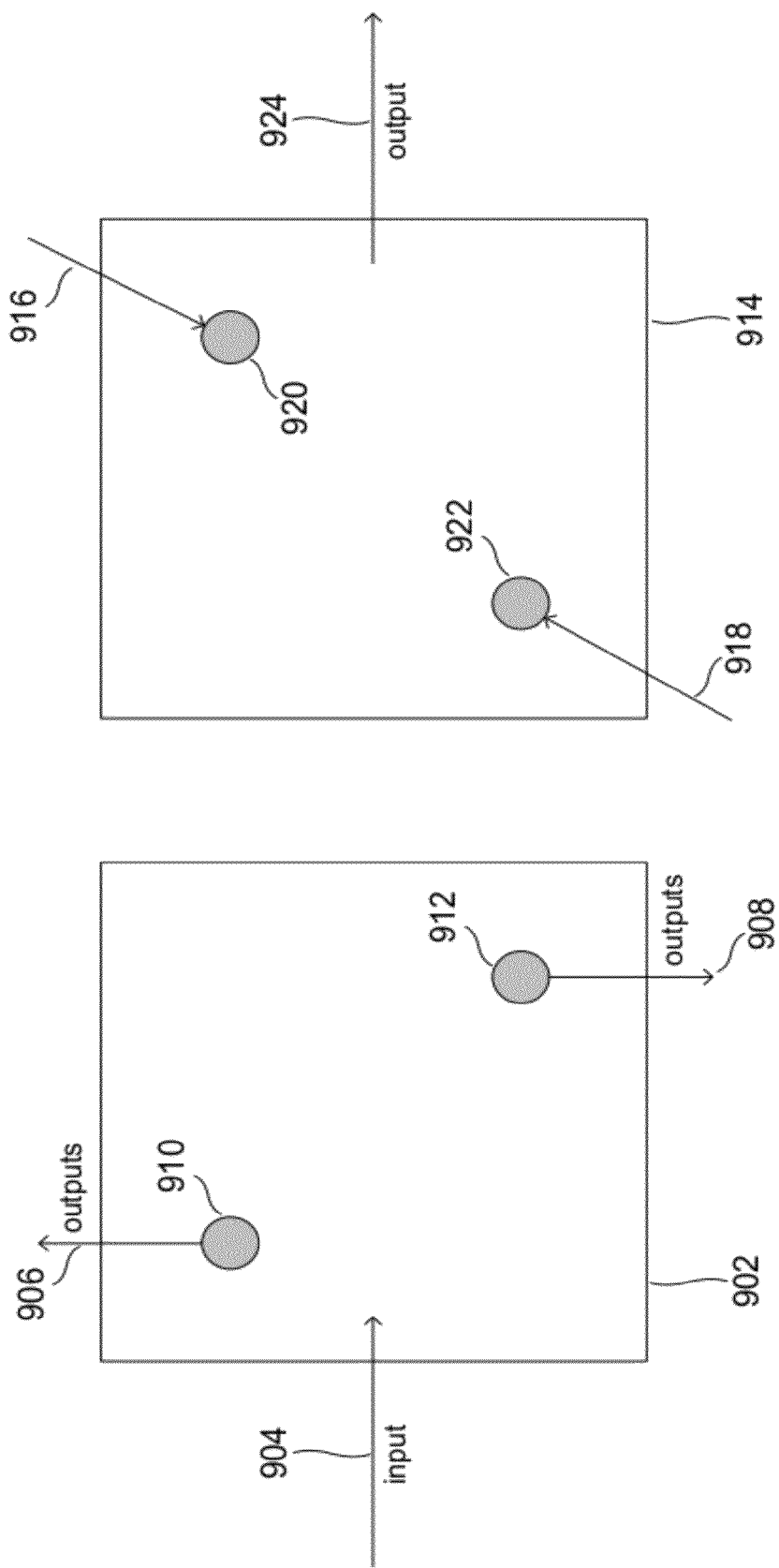
FIG. 9 illustrates examples of two additional types of computational cells, including an input computational cell and an output computational cell, employed within hybrid microscale-nanoscale neuromorphic integrated circuits that represent embodiments of the present invention.

FIG. 9 illustrates examples of two additional types of computational cells, including an input computational cell and an output computational cell, employed within hybrid microscale-nanoscale neuromorphic integrated circuits that represent embodiments of the present invention. An input computational cell 902 receives an input signal 904 from a signal-transmitting entity external to a hybrid microscale-nanoscale neuromorphic integrated circuit and, after processing the input signal, outputs processed signals 906 and 908 via the output-signal pins 910 and 912. An output computational cell 914 receives excitatory 916 and inhibitory 918 signals from external computational cells of a hybrid microscale-nanoscale neuromorphic integrated circuit through input signal pins 920 and 922 and processes the input signals to produce a processed signal 924 output to signal-receiving entities external to the neuromorphic integrated circuit. Output computational cells can additionally receive input through semiconductor-integrated-circuit-layer signal lines and input computational cells can additionally emit out signals to semiconductor-integrated-circuit-layer signal lines. In addition, input computational cells and output computational cells may be employed to convert between two different internal analog signals within a hybrid microscale-nanoscale neuromorphic integrated circuit.

Figure 10:
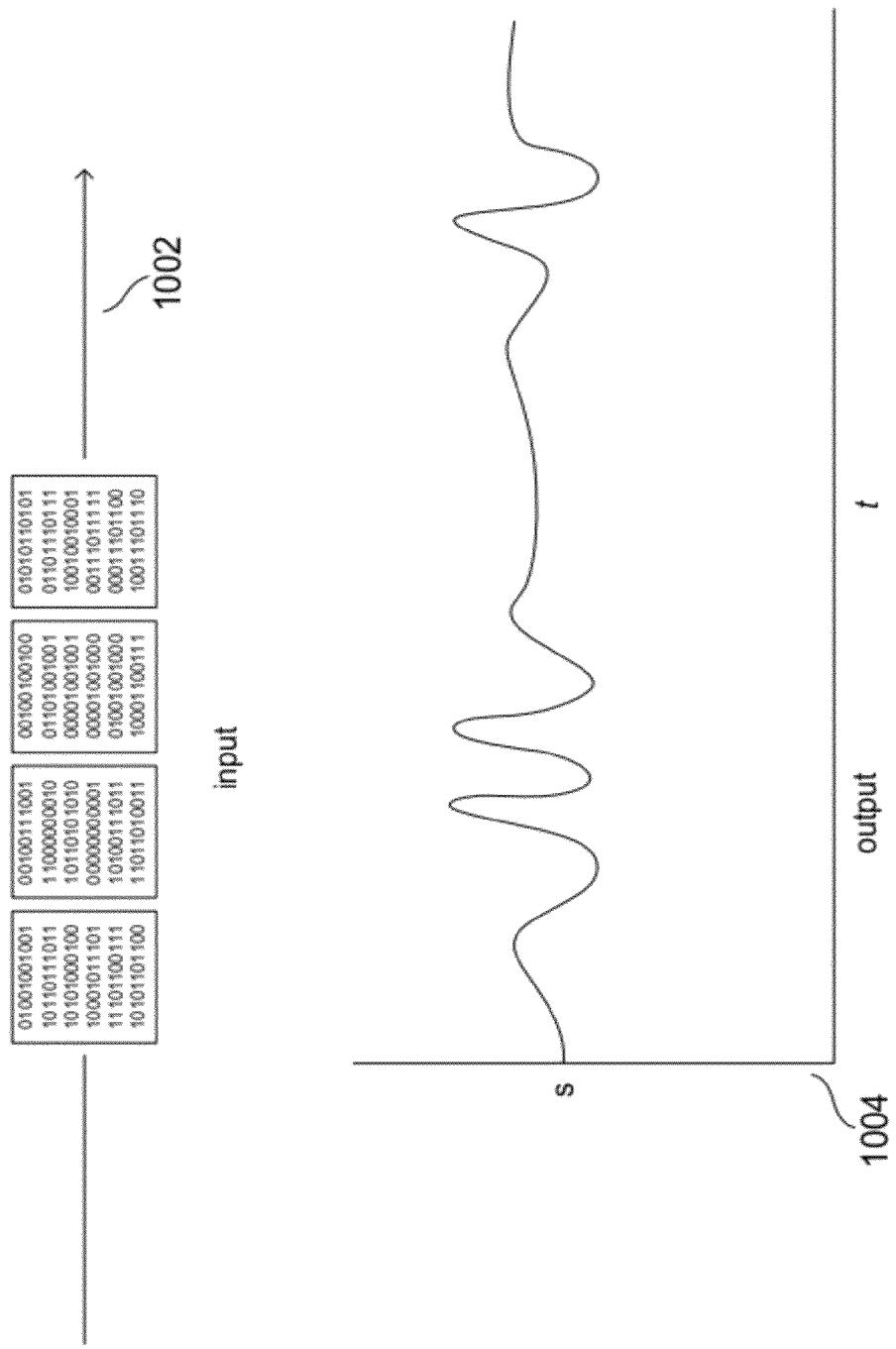
FIG. 10 illustrates input and output signals for an input computational cell of a microscale-nanoscale hybrid neuromorphic circuit that represents one embodiment of the present invention.

FIG. 10 illustrates input and output signals for an input computational cell of a microscale-nanoscale hybrid neuromorphic circuit that represents one embodiment of the present invention. In many cases, the input signal 1002 may be a packet-based digital signal, in which fixed-length or varying-length packets containing sequences of binary digits are transmitted from an external entity to the input computational cell. The input computational cell carries out digital-to-analog signal conversion in order to produce an analog voltage or current signal, shown in the signal versus time plot 1004 in FIG. 10. Similarly, an output computational cell (914 in FIG. 9) receives analog signals and carries out analog-to-digital signal conversion in order to output a packet-based, digital signal 1002. There are many different possible types of digital signals, and various different implementations of neuromorphic circuits may employ different types of analog signals. Therefore, the internal circuitry of input computational cells and output computational cells is quite dependent on both the types of digital signals received by, and exported from, a hybrid microscale-nanoscale neuromorphic integrated circuit as well as the various types of analog signals employed within an integrated neuromorphic integrated circuit.

Figure 11B:
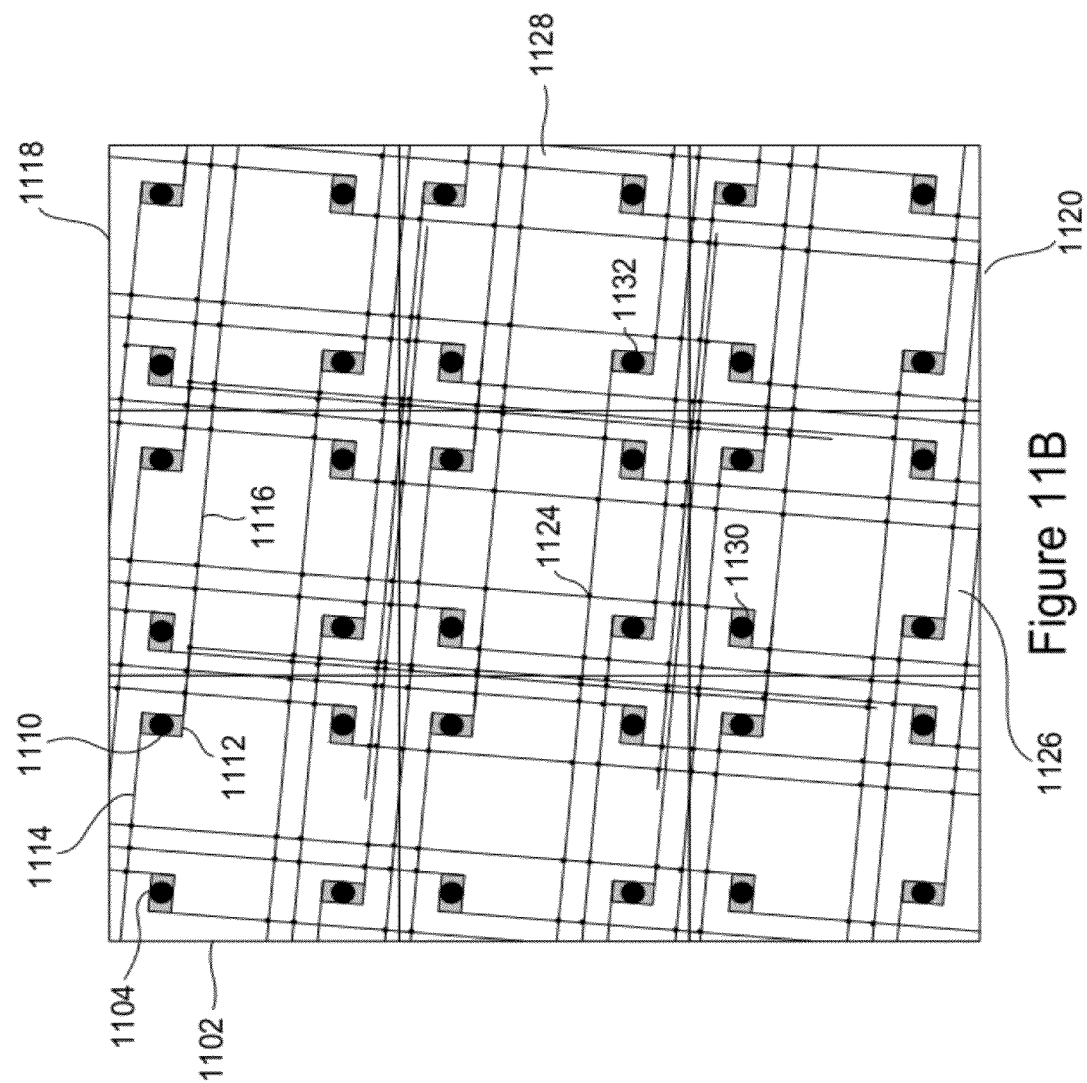

FIGS. 11A-B illustrate interconnection of computational cells within a hybrid microscale-nanoscale neuromorphic integrated circuit that represents one embodiment of the present invention. FIG. 11A shows a 3×3 array of 4-pin computational cells. As discussed above, each computational cell, such as computational cell 1102, includes two output pins 1104 and 1106, an inhibitory input pin 1108, and an excitatory input pin 1110. FIG. 11B shows the 3×3 array of computational cells, as shown in FIG. 11A, above which an interconnection layer, comprising two sublayers of parallel nanowires and a memristive-material sublayer, has been implemented. In FIG. 11B, each input pin, such as input pin 1110 of computational cell 1102, interfaces to a pad 1112 that joins a left-hand approximately horizontal nanowire 1114 to a right-hand, approximately horizontal nanowire 1116 and joins both the left-hand and right-hand nanowires 1114 and 1116 to the input pin 1112. Thus, all of the nanowires connected to input pins in the array of computational cells form a first sublayer of parallel nanowires. As shown in FIG. 11B, the nanowires are slightly rotated with respect to the direction of the upper 1118 and lower 1120 horizontal edges of the 3×3 array of computational cells. This rotation allows nanowires to extend horizontally in both leftward and rightward directions, and span many neighboring computational cells without overlying any additional vertical pins within, or external to, the computational cell to which the nanowires are connected via a pad and vertical pin. The output pins, such as output pin 1104 in computational cell 1102, are each similarly connected to an approximately vertical nanowire. Thus, the nanowires connected to output pins in the 3×3 array of computational cells form a second sublayer of approximately parallel nanowires, with the nanowires of the second sublayer approximately orthogonal to the nanowires of the first sublayer.

In FIG. 11B, memristive nanowire junctions between nanowires are shown as small filled disks, such as filled disk 1124, at the intersection between two nanowires. Memristive nanowire junction 1124 models a synapse interconnecting pre-synaptic neural cell 1126 and post-synaptic neural cell 1128. Memristive nanowire junction 1124 interconnects the output pin 1130 of pre-synaptic computational cell 1126 with the inhibitory input pin 1132 of post-synaptic neural cell 1128. According to the present invention, multiple nanowire-interconnection layers o may be implemented above the semiconductor-integrated-circuit-layer of a hybrid microscale-nanoscale neuromorphic integrated circuit. Multiple interconnection layers allow neural cells to be interconnected with one another through synapse-like memristive nanowire junctions at multiple, hierarchical, logical levels. The multiple-interconnection-layer neuromorphic-integrated-circuit architecture of the present invention provides for an extremely large number of different possible interconnection configurations of computational cells, and thus provides an extremely flexible and powerful interconnection architecture for implementing a very large number of different possible neuromorphic circuits.

In certain hybrid microscale-nanoscale neuromorphic-integrated-circuit embodiments of the present invention, nanowire junctions may be configured during manufacture, or may be subsequently programmed, to be in ON and OFF states, with only those nanowire junctions configured to be ON passing current and exhibiting synapse-like behavior, while the nanowire junctions configured to be OFF act as open switches. In other hybrid microscale-nanoscale neuromorphic-integrated-circuit embodiments of the present invention, the nanowire junctions are all configured to be in the ON state, and the conductance of each nanowire junction is determined exclusively by the voltage signals passing through it.

FIGS. 12A-F illustrate fabrication of a hybrid microscale-nanoscale neuromorphic integrated circuit that represents one embodiment of the present invention. FIGS. 12A-F illustrate fabrication of the neuromorphic integrated circuit with respect to a single computational cell. However, as discussed above, a hybrid microscale-nanoscale neuromorphic integrated circuit contains a very large number of computational cells that together tile the surface of the hybrid microscale-nanoscale neuromorphic integrated circuit. In certain embodiments, tens to hundreds of millions of individual computational cells may be fabricated on each square centimeter of semiconductor substrate. The fabrication methods illustrated in FIGS. 12A-F are generally applied simultaneously to all of the computational cells of a hybrid microscale-nanoscale neuromorphic integrated circuit.

Figure 12A:
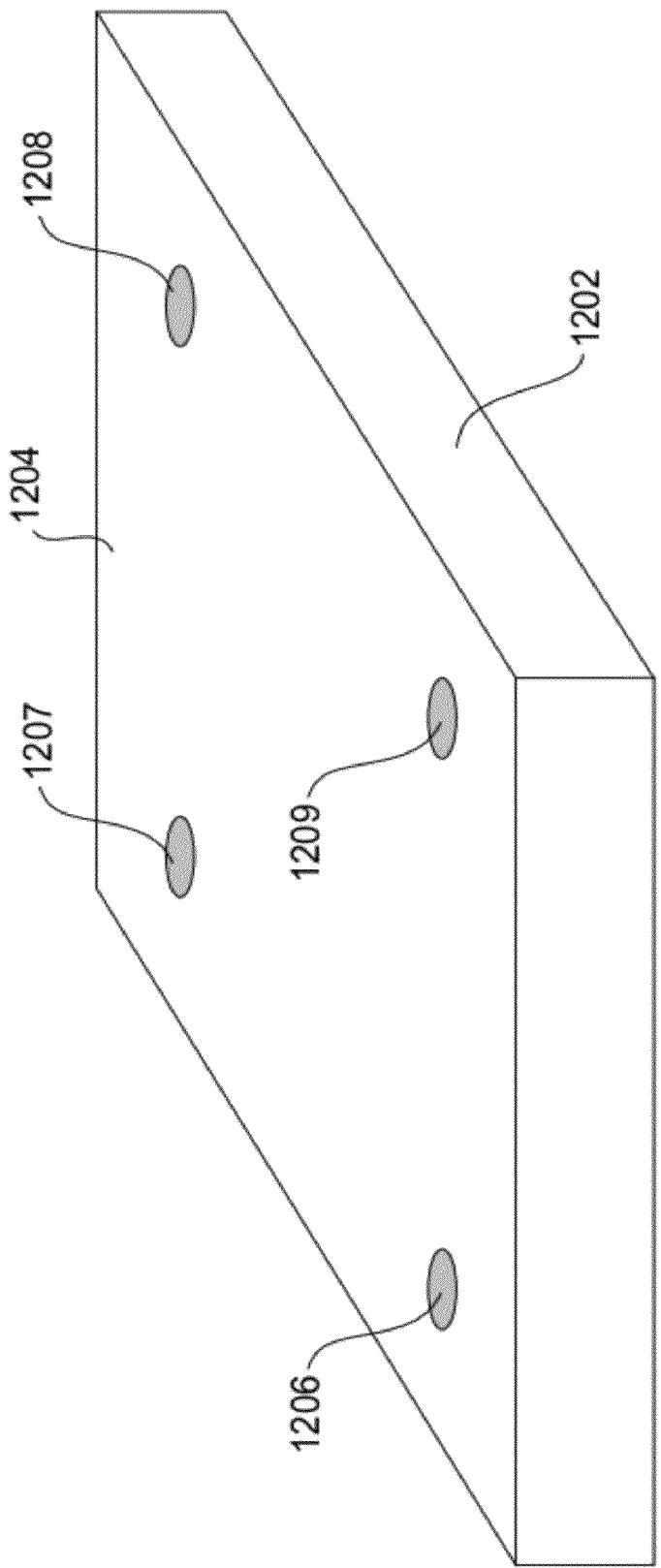
FIGS. 12A-F illustrate fabrication of a hybrid microscale-nanoscale neuromorphic integrated circuit that represents one embodiment of the present invention.
Figure 12B:
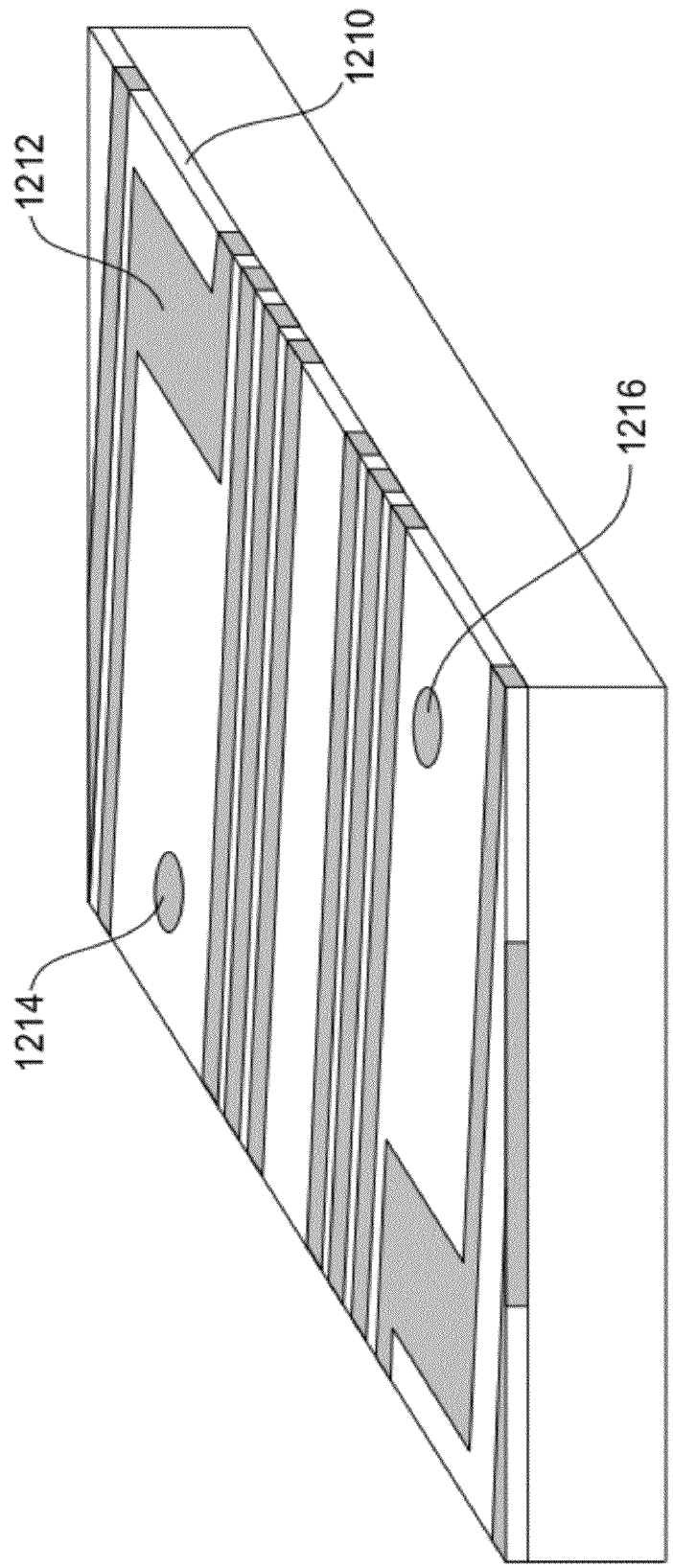

As shown in FIG. 12A, each computational cell 1202 is fabricated using any of various methods of integrated-circuit fabrication, including photolithography, doping, etching, and planarization techniques. The surface of the computational cell 1204 includes four conductive bases 1206-1209 for the four, vertical conductive pins, described above. Computational cells may have any of various shapes and sizes, depending on fabrication methods and the mathematical models for computational-cell behavior needed to be implemented by particular applications. Common shapes for cells include squares, rectangles, hexagons, and equilateral triangles, all of which can be laid out in two-dimensional arrays in order to completely tile the surface of a semiconductor substrate. In a first step following fabrication of the underlying integrated circuit, as shown in FIG. 12B, a first sublayer 1210 of nanowires is imprinted, or fabricated by other methods, above the surface of the integrated circuit, each nanowire contacting a single vertical pin through a pad-like structure, such as pad 1212, and extending in opposite directions from the pad to form a single nanowire. As shown in FIG. 12B, the nanowires of the first sublayer of nanowires are parallel to one another, and connect to both input pins, or to both output pins, of the underlying computational cell, with a single nanowire of a given sublayer connecting to at most one pin. The vertical pins not connected to nanowires of the first sublayer are extended in the first sublayer 1214 and 1216 as vias overlapping the underlying vertical-pin conductive bases (1207 and 1209 in FIG. 12A).

Figure 12C:
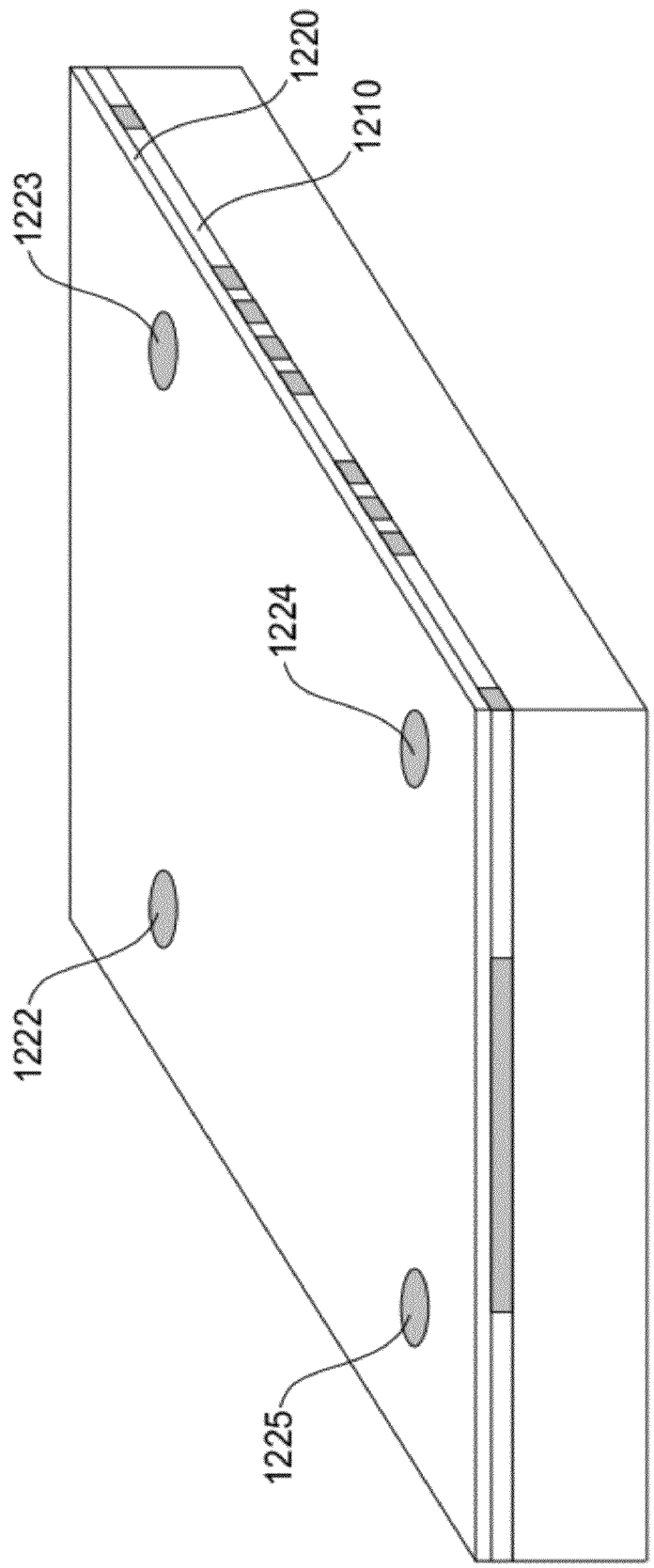
Figure 12D:
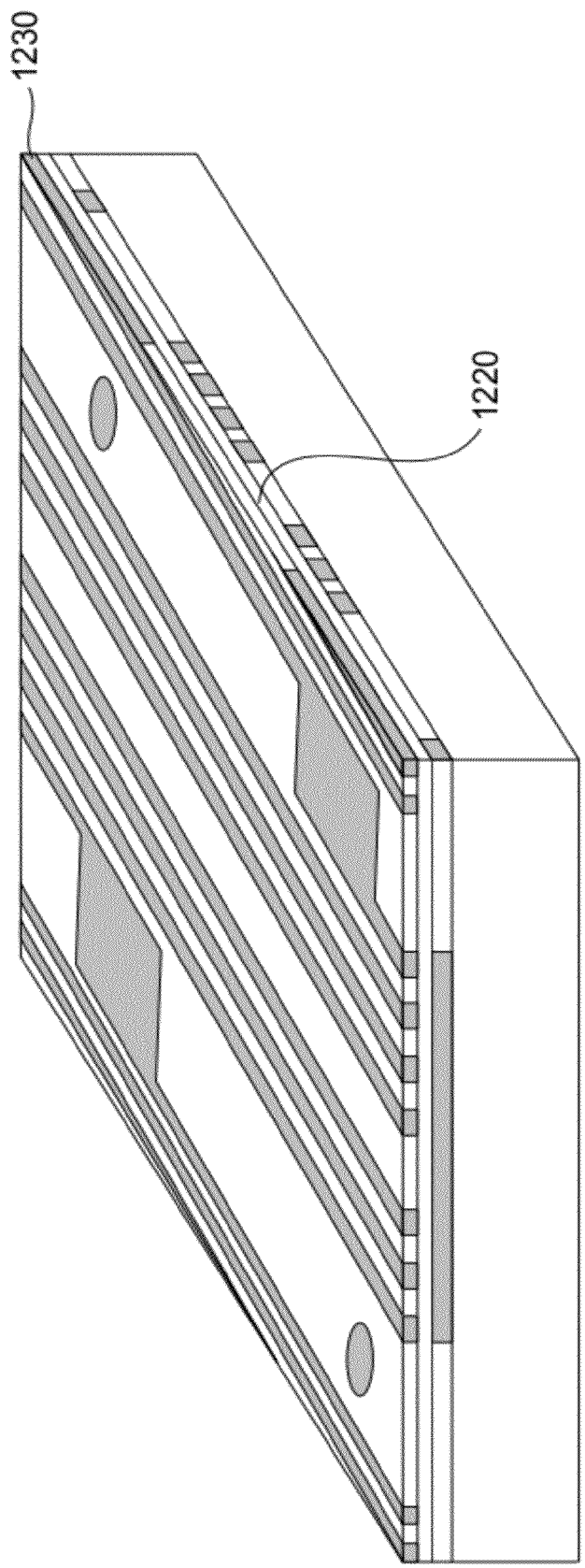
Figure 12E:
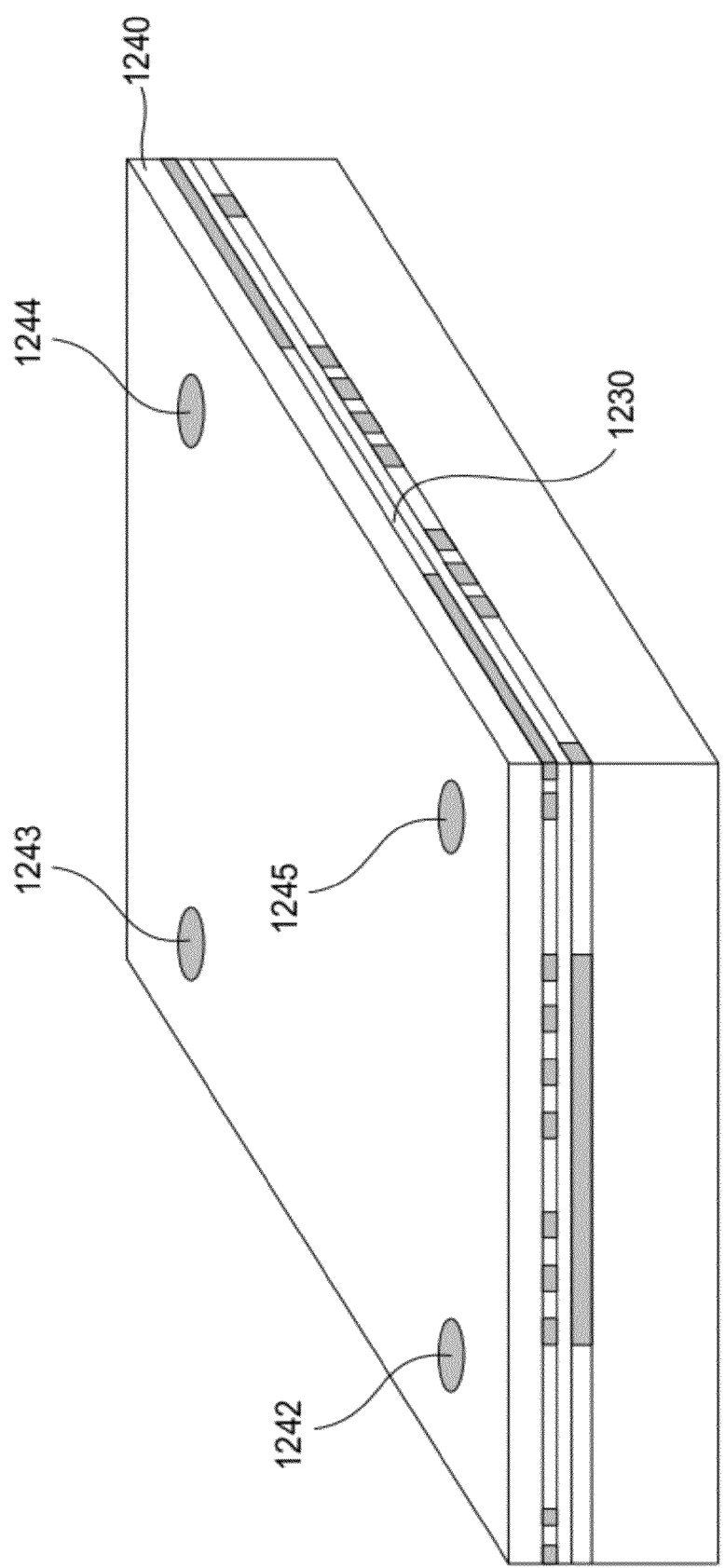

Next, as shown in FIG. 12C, a thin layer of memristive material 1220 is applied to the upper surface of the first nanowire sublayer 1210. This memristive material forms the memristive nanowire junctions between nanowires of the first sublayer 1210 and nanowires of the second sublayer added in a following step. Note that the conductive pins are continued through the memristive material layer by embedded vias 1222-1225. Next, as shown in FIG. 12D, a second sublayer of nanowires 1230 is added above the memristive layer 1220. The nanowires of the second sublayer of nanowires are parallel, and each nanowire is connected to a single vertical pin. When the first nanowire sublayer is connected to output pins, the second nanowire sublayer is connected to input pins, and vice-versa. Note that the nanowires of the second sublayer are approximately orthogonal to the nanowires of the first sublayer. Next, as shown in FIG. 12E, an insulating layer 1240 is added above the second nanowire sublayer 1230, with the vertical pins again extended by embedded vias 1242-1245.

Figure 12F:
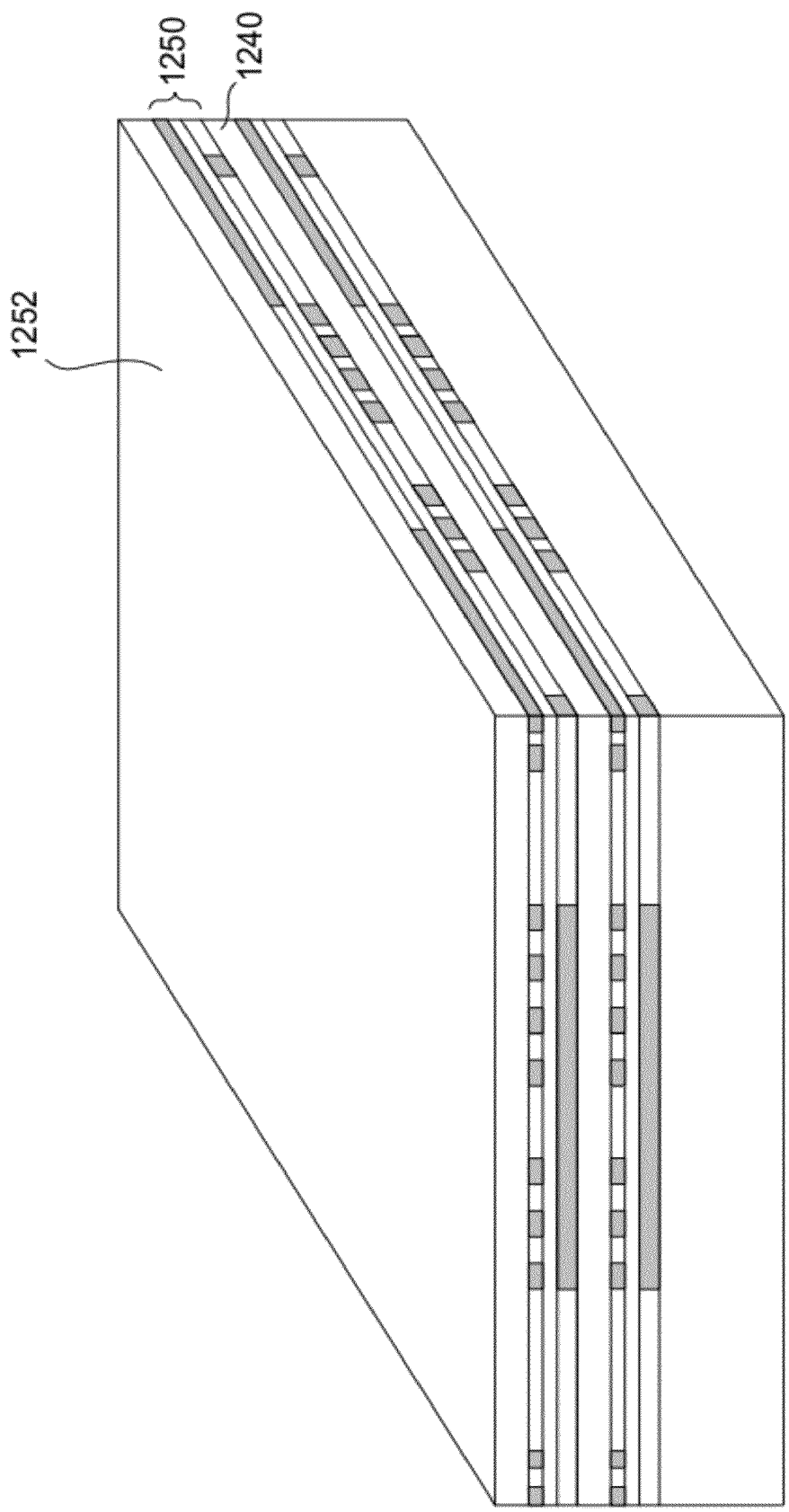

As shown in FIG. 12F, an additional nanowire-interconnection layer 1250 can be fabricated on top of the first insulating layer 1240. Microscale-nanoscale hybrid neuromorphic integrated circuits that represent embodiments of the present invention may include an essentially arbitrary number of interconnection layers, with the top-most insulating layer 1252 generally fully insulating the underlying interconnection layers and therefore not including embedded vias to extend the vertical pins to the surface of the final insulating layer. Again, FIGS. 12A-F illustrate the fabrication process from the standpoint of a single computational cell, but, for useful devices, many millions, tens of millions, or hundreds of millions of computational cells are fabricated together, in each square centimeter of substrate surface, in the series of steps illustrated in 12A-F.

Figure 13:
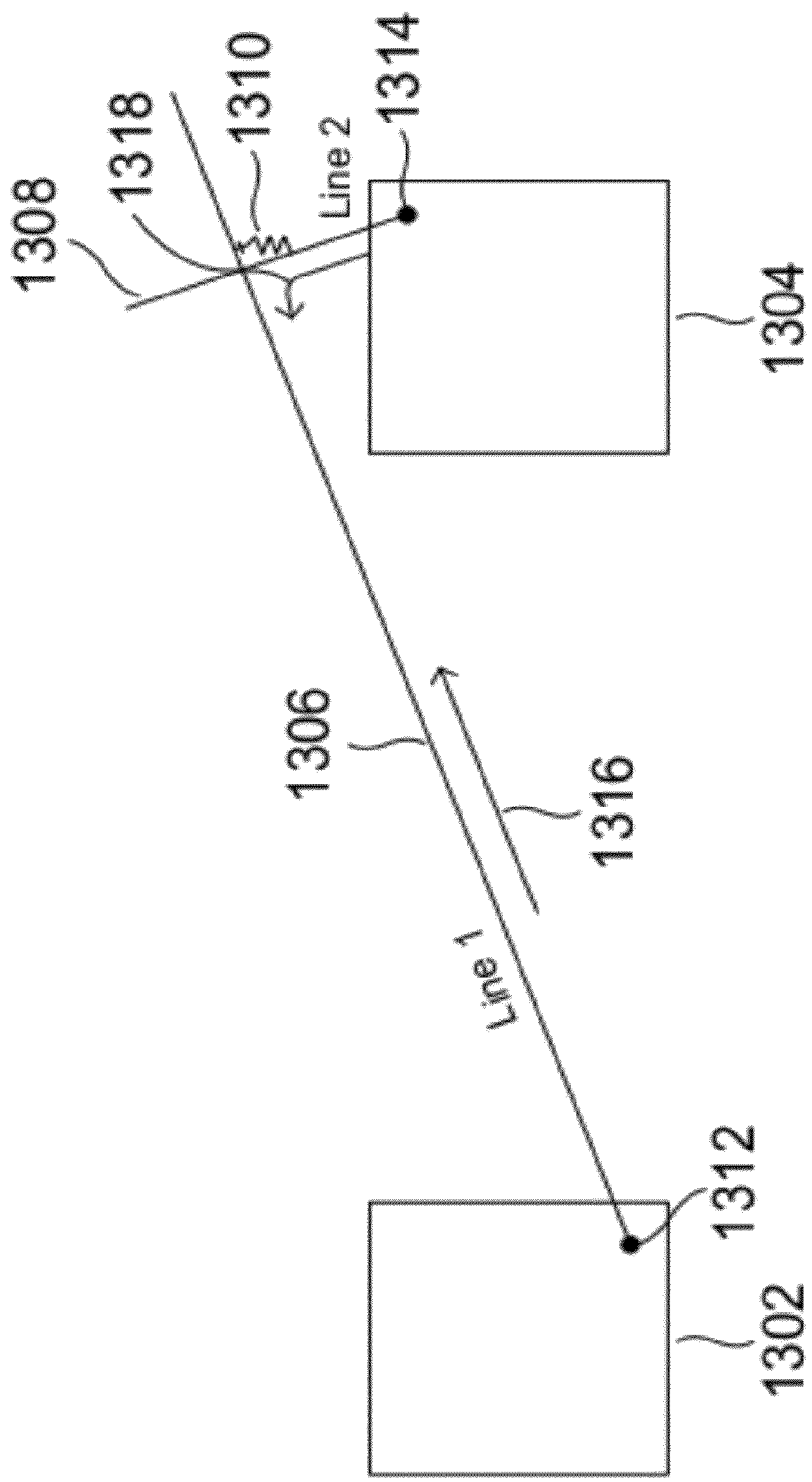
FIG. 13 illustrates bi-directional signals transmitted through nanowires of the nanowire-interconnection layers of a hybrid microscale-nanoscale neuromorphic integrated circuit that represents one embodiment of the present invention.

FIG. 13 illustrates bi-directional signals transmitted through nanowires of the nanowire-interconnection layers of a hybrid microscale-nanoscale neuromorphic integrated circuit that represents one embodiment of the present invention. In FIG. 13, a first neural cell 1302 is interconnected with a second neural cell 1304 via a first nanowire 1306, a second nanowire 1308, and a memristive nanowire junction 1310 interconnecting the first nanowire 1306 with the second nanowire 1308. The first nanowire is connected to an output pin 1312 of the first, pre-synaptic neural cell 1302, and the second nanowire 1310 is connected to an input pin 1314 of the second, post-synaptic neural cell 1304. As discussed above, when the pre-synaptic neural cell has an activity greater than a threshold activity, the pre-synaptic neural cell emits forward signals, represented in FIG. 13 by directional arrow 1316. Similarly, when the post-synaptic cell has an activity above a second threshold activity level, the post-synaptic cell emits backward signals, represented in FIG. 13 by arrow 1318, through input pins toward the pre-synaptic neural cell 1302. Emission of both forward signals and backward signals of the neural cells provides for, in certain embodiments of the present invention, state changes within the memristive material of the nanowire junction that model synapse behavior, as discussed above.

Figure 14:
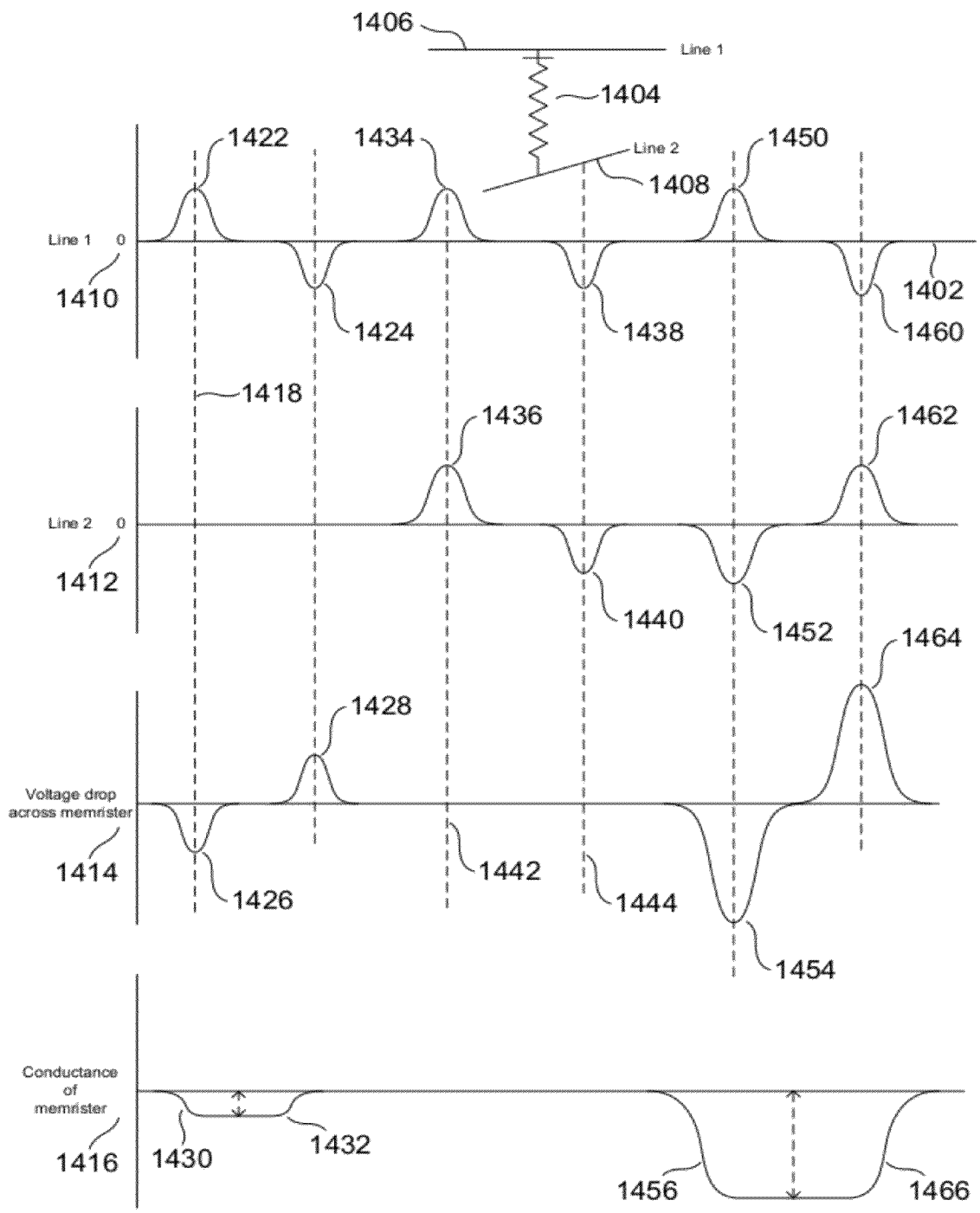
FIG. 14 illustrates conductance changes in a memristive nanowire junction through which a pre-synaptic neuron and a post-synaptic neuron are interconnected.

FIG. 14 illustrates conductance changes in a memristive nanowire junction through which a pre-synaptic neuron and a post-synaptic neuron are interconnected. In FIG. 14, the various plots of signals are vertically aligned with respect to time, plotted in all cases with respect to a horizontal time axis, such as time axis 1402. The various plots in FIG. 14 illustrate signals and state changes in a memristive nanowire junction 1404 that connects a first signal line 1406 with a second signal line 1408. A first plot 1410 plots the forward signal transmitted through the first signal line 1406, emanating from a pre-synaptic node (1302 in FIG. 13) connected to the first signal line. A second plot 1412 plots the backward signal transmitted through the second signal line, emanating from a post-synaptic node (1304 in FIG. 13) connected to the second signal line. The third plot 1414 illustrates the voltage drop across the memristor 1404 at each point in time, and the final plot 1416 shows the conductance of the memristor at each point in time. Dashed vertical lines, such as dashed vertical line 1418, show certain points in time in each of the various plots 1410, 1412, 1414, and 1416.

When the forward signal exhibits a positive voltage peak 1422 or a negative voltage peak 1424, while the backward signal is flat, a relatively small negative voltage drop 1426 and a relatively small positive voltage drop 1428 occur across the memristor, respectively. These small voltage drops produce a corresponding small decrease 1430 and small increase 1432 in the conductance of the memristor. When like signed and equal magnitude voltage peaks occur both in the forward and backward signals, 1434 and 1436 and 1438 and 1440, no voltage drop 1442 and 1444 is produced across the memristive nanowire junction, and therefore the conductance of the memristor does not change. However, when a positive peak 1450 occurs in the forward signal and a negative peak 1452 occurs in the backward signal at the same instant in time, a relatively large negative voltage drop 1454 occurs across the memristor, producing a correspondingly large drop 1456 in conductance. Similarly, a negative voltage peak 1460 in the forward signal corresponding in time with a positive peak 1462 in the backward signal produces a relatively large positive voltage drop 1464 across the memristor, producing a corresponding large conductance increase 1466 in the memristive substance. Thus, by generating certain types of forward and backward signals, neural cells may cause a connecting memristive nanowire junction to exhibit conductive changes that model the synapse behavior, described above mathematically. Using appropriate wave forms for forward and backward signals, the memristive material can be induced to exhibit large changes in conductivity at times when the post-synaptic neuron has high activity immediately following high-activity-induced transmission of a forward signal by the pre-synaptic neural cell, according to a Hebbian-learning model for synapse behavior. Furthermore, the conductivity of the memristive nanowire junctions reflect past patterns of activity levels and signal emission from the pre-synaptic and post-synaptic neural cells which they interconnect.

Figure 15:
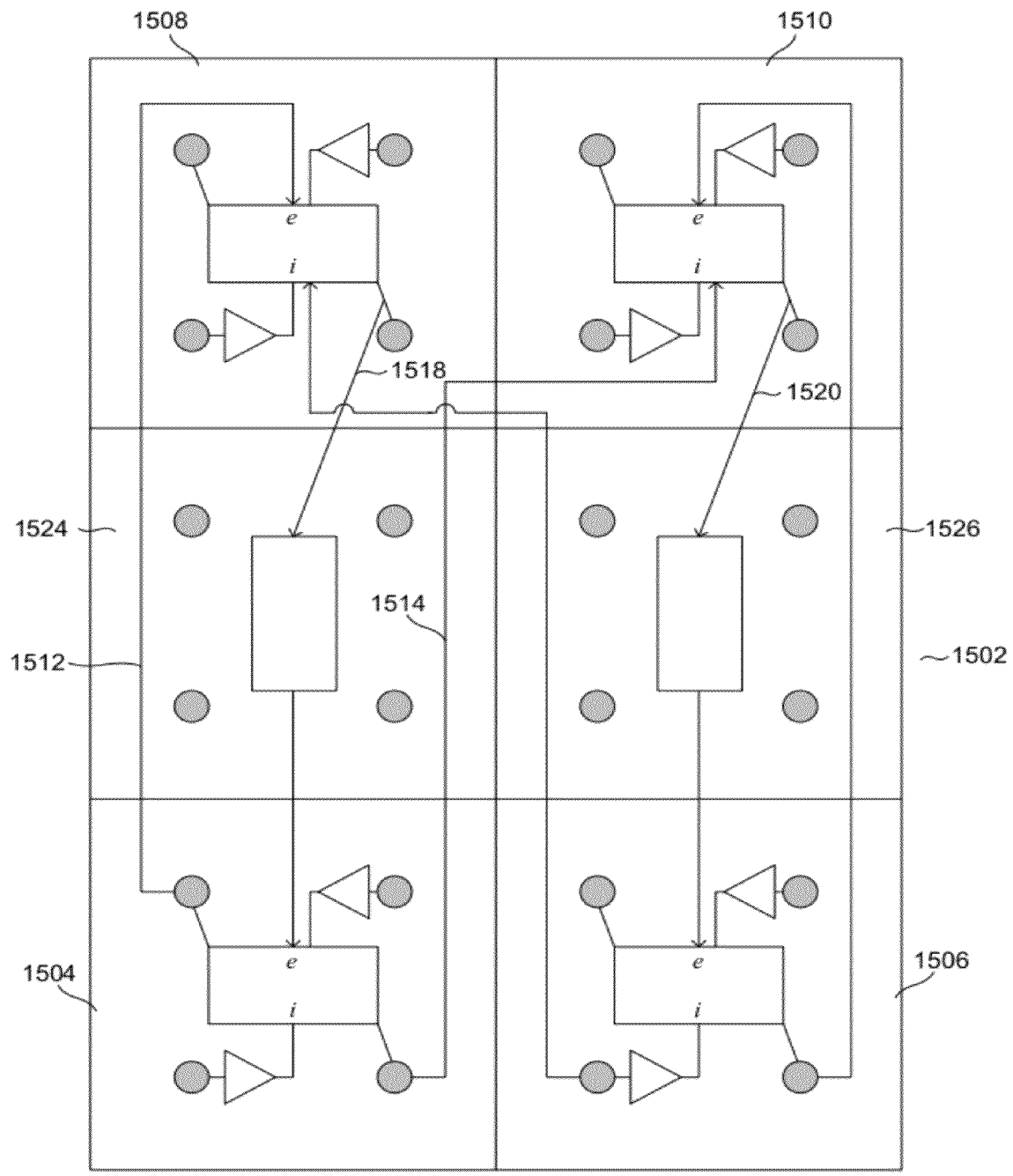
FIG. 15 illustrates an implementation of a six-computational-cell dipole, which exhibits analog behavior similar to that of a digital-logic flip-flop, according to one embodiment of the present invention.

A variety of different functional modules, comprising multiple adjacent computational cells, can be fabricated within a hybrid microscale-nanoscale neuromorphic integrated circuit according to embodiments of the present invention. FIG. 15 illustrates an implementation of a six-computational-cell dipole, which exhibits analog behavior similar to that of a digital-logic flip-flop, according to one embodiment of the present invention. The dipole module 1502 is fabricated entirely in the integrated-circuit layer of a hybrid microscale-nanoscale neuromorphic integrated circuit that represents one embodiment of the present invention. Neural cells 1504 and 1506 represent input nodes of the dipole, and neural cells 1508 and 1510 represent output nodes of the dipole. In the dipole, one output node tends to have high activity when the other output node has low activity, and vice-versa, and the activity states of the output nodes tend to remain constant under constant input to input nodes, or no input to input nodes. Thus, the dipole operates as an analog flip-flop, essentially latching one of two possible activity-level states of the output nodes. Input node 1504 transmits excitatory signals, via signal line 1512, to output node 1508 and transmits inhibitory signals, via signal line 1514, to output node 1510. Input node 1506 follows a similar, but opposite pattern of signal transmission. The output nodes output positive feedback signals 1518 and 1520 through HTG nodes 1524 and 1526 to input nodes 1504 and 1506. Thus, when input node 1504 has high activity, output node 1408 tends to have high activity, and reinforce the high activity of the input node 1504. When input node 1506 has high activity, output node 1510 tends to have high activity, and reinforce the high activity of input node 1506. The left-hand column of computational nodes 1504 and 1508 therefore compete for a high-activity state with the right-hand column of computational cells 1506 and 1510.

Figure 16:
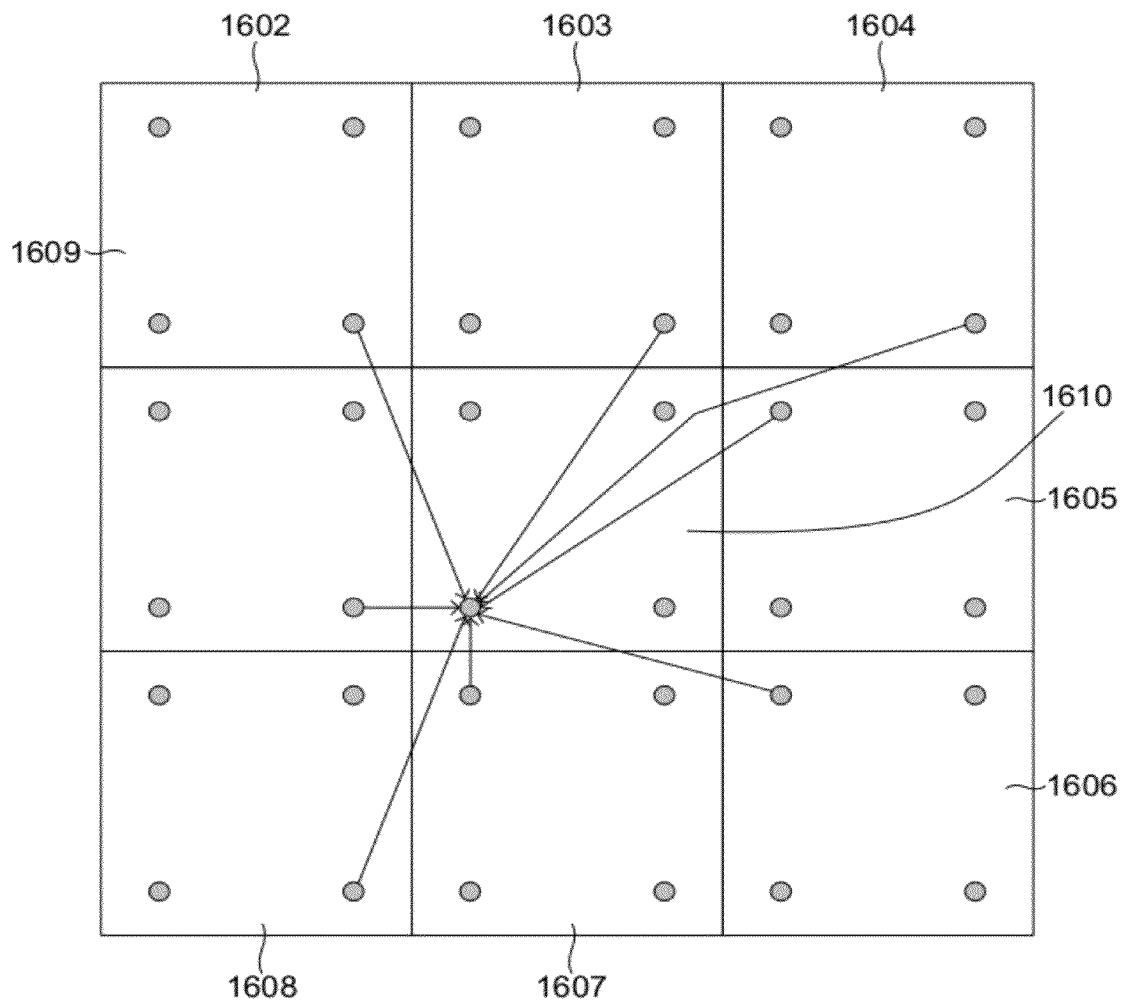
FIG. 16 illustrates a second type of multi-computational-cell module that may be employed in a hybrid microscale-nanoscale neuromorphic integrated circuit that represents one embodiment of the present invention.

FIG. 16 illustrates a second type of multi-computational-cell module that may be employed in a hybrid microscale-nanoscale neuromorphic integrated circuit that represents one embodiment of the present invention. The module shown in FIG. 16 is a nine-computational-cell surround, in which the eight peripheral computational cells 1602-1609, when active, transmit inhibitory, lateral signals to the central computational cell 1610. A variety of different types of surrounds, including a variety of different numbers of computational cells, can be fabricated within a hybrid microscale-nanoscale neuromorphic integrated circuit that represents one embodiment of the present invention. In certain cases, a small, adjacent annulus of computational cells may transmit excitatory signals to the central cell, while a larger, surrounding annulus of peripheral computational cells may transmit inhibitory signals to a central computational cell, or vice-versa. In additional types of surrounds, feedback signals may be transmitted from the central cell to peripheral cells, and vice-versa. In certain cases, multiple central cells may be surrounded by one or more annuli of surround cells, each providing a different type, or level, of forward signals feedback. Surrounds are frequently used for implementing various types of pattern-recognition circuits and orientation maps.

Figure 17:
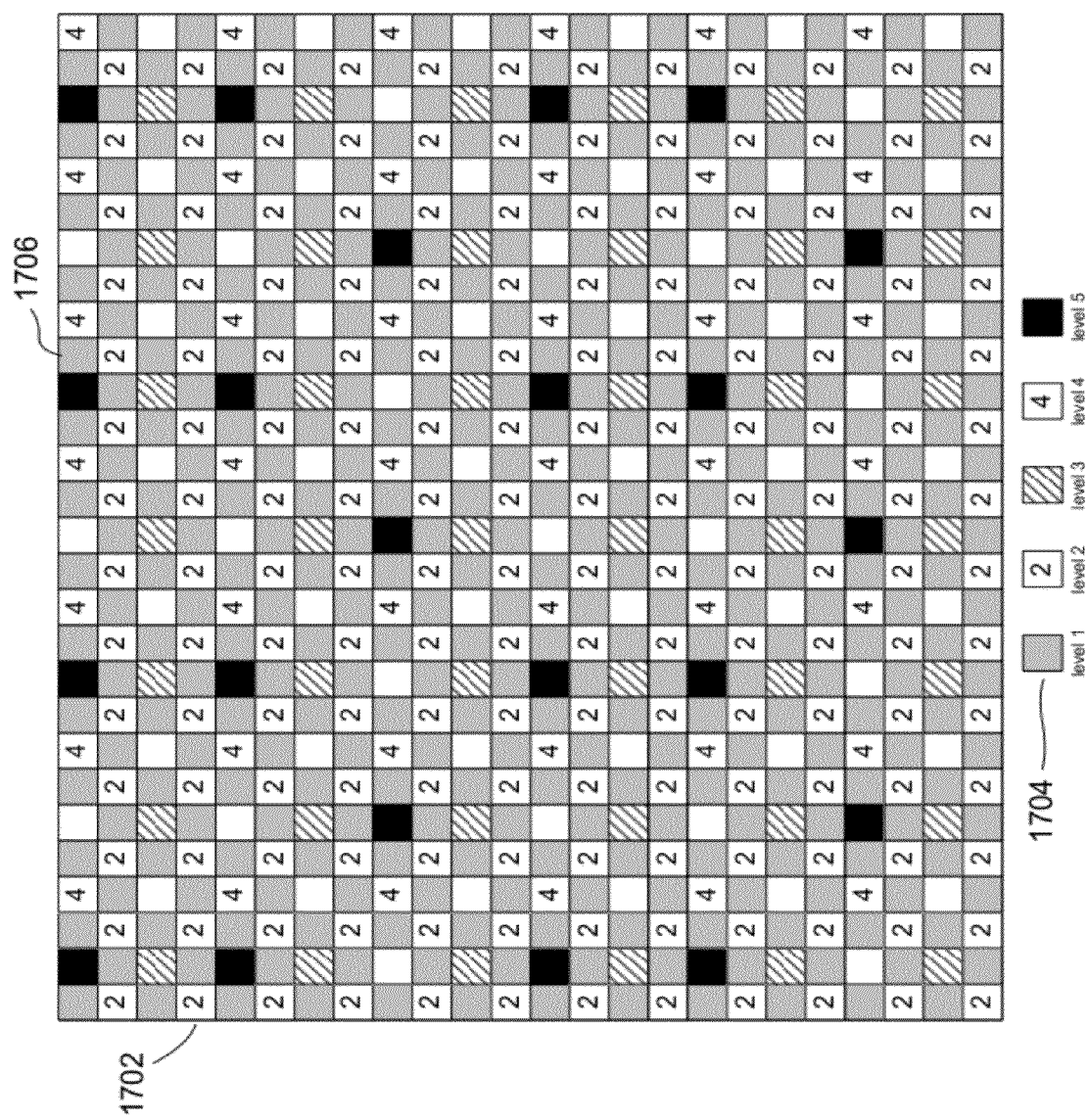
FIG. 17 illustrates hierarchical interconnection of computational cells within a hybrid microscale-nanoscale neuromorphic integrated circuit that represents one embodiment of the present invention.

FIG. 17 illustrates hierarchical interconnection of computational cells within a hybrid microscale-nanoscale neuromorphic integrated circuit that represents one embodiment of the present invention. FIG. 17 shows a 24×28 array of computational cells 1702. Each cell is assigned to a logical level according to the logical-level key 1704 provided below the array. For example, the shaded computational cells, such as shaded computational cell 1706, form a first logical level. Such hierarchical logical arrangements of computational cells can be implemented by using one nanowire-interconnect layer to interconnect neural cells of each level. For example, the first-level computational cells may be laterally interconnected by nanowires and memristive nanowire junctions within a first nanowire-interconnect layer. Second-logical-level cells may be similarly interconnected by a second nanowire-interconnect layer. In addition, forward and feedback interconnections and may traverse multiple interconnection levels and thus provide for exchange of signals between logical levels. Hierarchically ordered layers of computational cells are useful in various types of pattern-recognition neuromorphic circuits and inference engines that draw inferences from multiple inputs.

Figure 18:
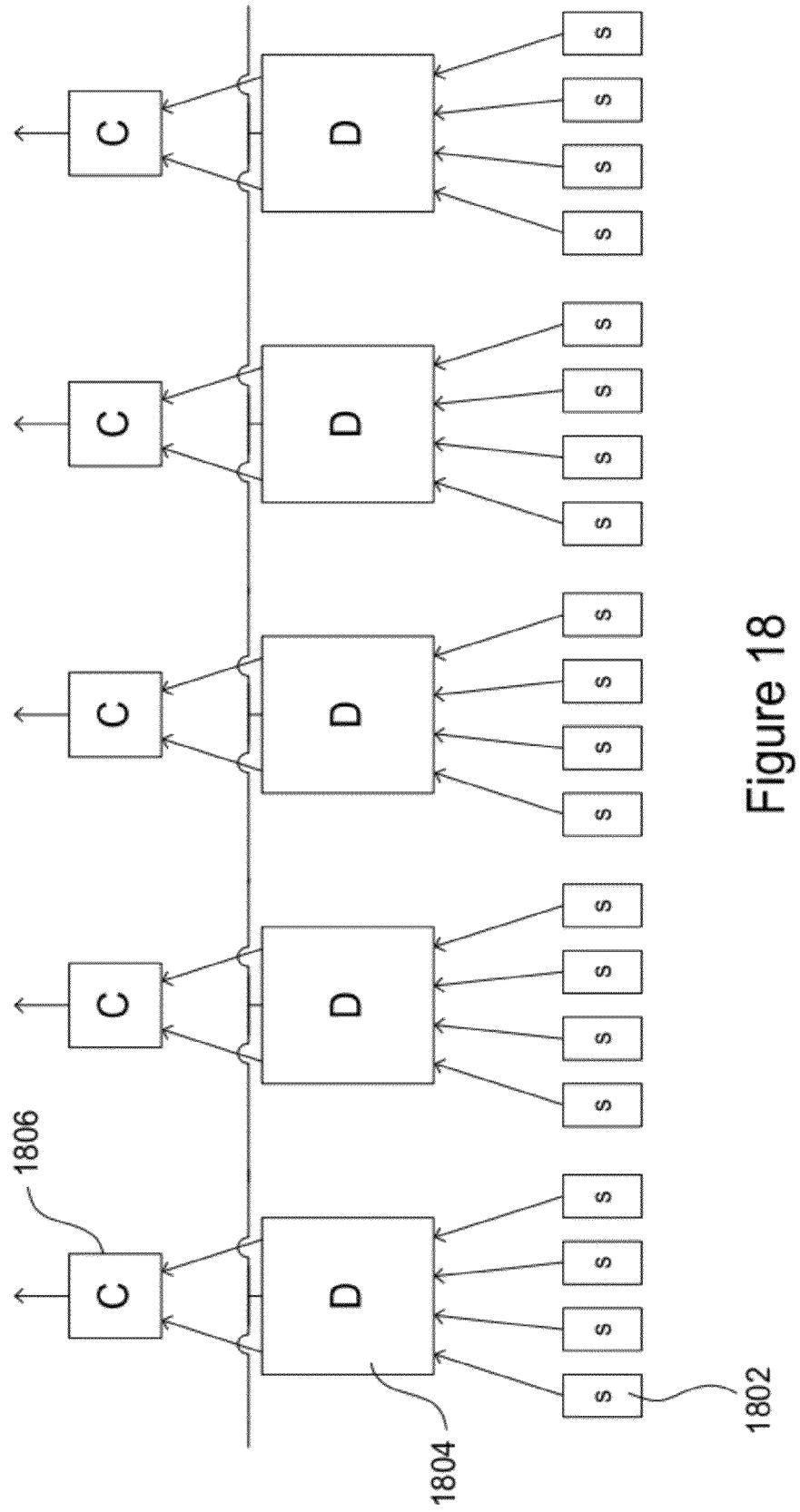
FIG. 18 illustrates a second type of logical structure that may be implemented in a hybrid microscale-nanoscale neuromorphic integrated circuit that represents one embodiment of the present invention.
Figure 19:
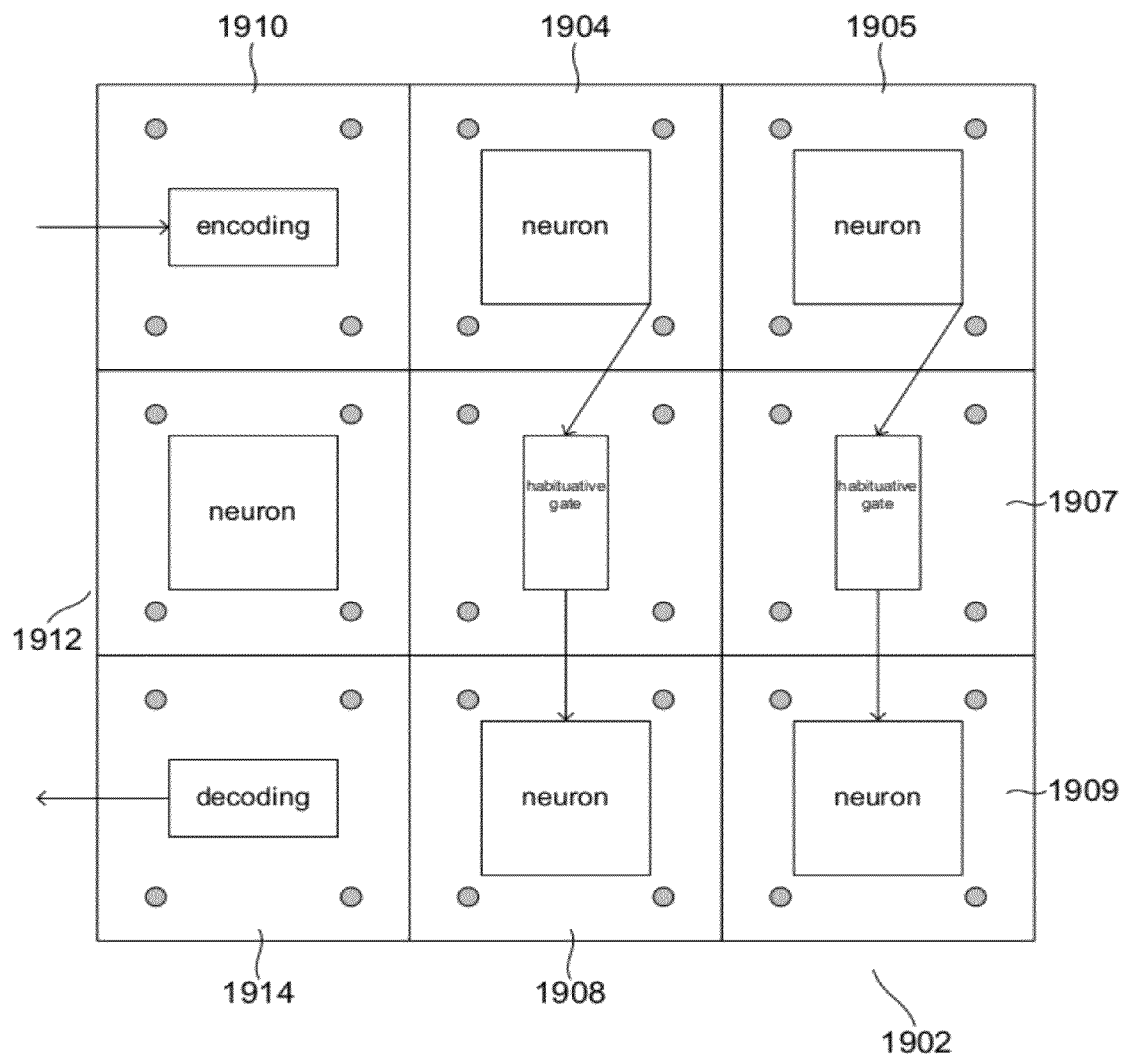
FIG. 19 illustrates a laminar-cortical-circuit module that may be fabricated according to the present invention and that may be employed together with a number of adjacent, laminar-cortical-layer modules, to implement a laminar-cortical-layer neuromorphic circuit.

FIG. 18 illustrates a second type of logical structure that may be implemented in a hybrid microscale-nanoscale neuromorphic integrated circuit that represents one embodiment of the present invention. A laminar cortical layer, shown in FIG. 18, may comprise a number of lower-level sensor-input computational cells, such as computational cell 1802, each connected to a dipole module, such as dipole module 1804, that models a simple cell of a laminar cortical layer. The dipole modules are, in turn, interconnected with one another as well as with complex cells, such as complex cell 1806, that output signals to higher-level computational cells or output cells. Laminar cortical layers find use in perceptrons and many other types of neuromorphic circuits. FIG. 19 illustrates a laminar-cortical-circuit module that may be fabricated according to the present invention and that may be employed together with a number of adjacent, laminar-cortical-layer modules, to implement a laminar-cortical-layer neuromorphic circuit. The laminar-cortical-layer module 1902 includes a six-computational-cell dipole, implemented from the six computational cells 1904-1909. An input computational cell 1910 represents a sensor input, and the pair of computational cells 1912 and 1914 represents a complex cell of the laminar cortical layer. Larger modules may include additional sensor-input cells in order to provide multiple sensor inputs to the dipole comprising computational cells 1904-1909. Interconnections between the cells may be fabricated exclusively in the semiconductor-integrated-circuit layer, or may additionally employ one or more nanowire interconnection layers.

Although the present invention has been described in terms of particular embodiments, it is not intended that the invention be limited to these embodiments. Modifications within the spirit of the invention will be apparent to those skilled in the art. For example, computational cells may implement various cell types in addition to neurons, input cells, output cells, and HTG cells. While 4-pin computational units appear to provide adequate connectivity for many types of neuromorphic circuits, a larger number or smaller number of input and output pins may be employed in various alternative embodiments. As discussed above, additional signal lines and other signal-transmission-related components may be fabricated within the integrated-circuit level of a hybrid microscale-nanoscale neuromorphic integrated circuit, according to embodiments of the present invention. Semiconductor-integrated-circuit-layer signal lines may be employed to provide additional connectivity between the computational cells of multi-computational-cell modules and other logical units within a hybrid microscale-nanoscale neuromorphic integrated circuit. The semiconductor-integrated-circuit layer of a hybrid microscale-nanoscale neuromorphic integrated circuit may be fabricated in any of various different types of semiconductor substrates using any of a large number of integrated-circuit fabrication techniques. Neuromorphic integrated circuits may be fabricated with different dimensions and areas, and may incorporate additional functionality, including defect-detection, defect-amelioration, and defect-tolerance functionality to accommodate defective computational cells within an array of computational cells. A neuromorphic integrated circuit may employ both current and voltage signals internally, and may receive and export various types of external signals, including digital packet-based signals. In many embodiments of the present invention, internal neuromorphic-integrated-circuit signals include both analog current and analog voltage signals. While various types of forward and backward analog-signal patterns, resembling biological axonal spikes, can be employed within neuromorphic integrated circuits, neuromorphic integrated circuits may also operate based on simple voltage-level and/or current-level signals. A neuromorphic integrated circuit may include additional functions, including clock-signal-propagating functions to provide timing signals to input computational cells and output computational cells. A neuromorphic integrated circuit may additionally include multiple integrated-circuit layers, each interconnected with associated multiple nanowire-interconnection layers.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A neuromorphic integrated circuit comprising:
an array of analog computational cells fabricated on an integrated-circuit-substrate, the analog electronic circuitry within each computational cell connected to one or more pins of a first type and to one or more pins of a second type that extend approximately vertically from the computational cells; and
one or more nanowire-interconnect layers above the array of analog computational cells, each nanowire-interconnect layer including:
a first sublayer of approximately parallel nanowires, each nanowire of the first sublayer connected to a single computational-cell pin of the first type,
a memristive sublayer, and
a second sublayer of approximately parallel nanowires, each nanowire of the second sublayer connected to a single computational-cell pin of the second type, the nanowires of the second sublayer oriented in a direction non-parallel to the direction of the nanowires of the first sublayer.

2. The neuromorphic integrated circuit of claim 1 wherein the nanowires of the second sublayer overlap nanowires of the first sublayer, forming memristive nanowire junctions, each interconnecting a second-sublayer nanowire with a first-sublayer nanowire through the memristive sublayer, that model synapses.

3. The neuromorphic integrated circuit of claim 2 wherein a memristive nanowire junction implements a model that can be expressed as:

$$\frac{dz_{ij}}{dt} = \varepsilon f((x_j)(-\omega z_{ij} + g(x_i)))$$

where
$z_{ij}$ is the weight of, or gain produced by, the synapse ij interconnecting pre-synaptic neuron i with post-synaptic neuron j;
$\varepsilon$ is a learning rate;
$\omega$ is a forgetting rate;
$f(x_j)$ is non-linear function of the activity of neuron i;
$g(x_i)$ is non-linear function of the activity of neuron j; and
t is time.

4. The neuromorphic integrated circuit of claim 2 wherein the computational cells include:
neuron computational cells;
input computational cells; and
output computational cells.

5. The neuromorphic integrated circuit of claim 4 wherein each neuron computational cell includes:
a first summing functional component that outputs a sum of excitatory signals input to the neuron computational cell;
a second summing functional component that outputs a sum of inhibitory signals input to the neuron computational cell;
a signal-generating functional component that combines the outputs from the first and second summing functional components to output an analog signal;
a leaky-integrator functional component that integrates the output of the signal-generating functional component over a preceding time interval to output an integrated signal; and a thresholding functional component that, when the integrated signal exceeds a threshold value, activates output-signal emission from the neuron computational cell.

6. The neuromorphic integrated circuit of claim 4 wherein the neuron computation cell implements a model that can be expressed as:

$$\frac{dx_i}{dt} = -Ax_i + (B - x_i)\left[\sum_{j=1}^{n} f_j(x_j)z_{ji}\right] - x_i\left[\sum_{j=1}^{m} g_j(x_j)z_{ji}\right]$$

where
- i is the modeled neuron;
- $x_i$ is the activity of neuron i;
- t is time;
- $f_j(x_j)$ is a non-linear function of the activity of neuron j;
- $z_{ji}$ is weight of synapse between neurons j and i;
- $g_j$ is a non-linear function of the activity of neuron j;
- n is the number of neuron linked to node i through excitatory inputs;
- m is number of neurons linked to node i through inhibitory inputs; and
- A and B are constants.

7. The neuromorphic integrated circuit of claim 4 wherein each input computational cell includes:
an encoding circuit that receives an external signal and converts the received signal into an analog signal that is output to one or more computational cells of the neuromorphic integrated circuit.

8. The neuromorphic integrated circuit of claim 7 wherein the external signal is a digital, packet-based signal that the encoding circuit converts to one of an analog voltage signal or an analog current signal.

9. The neuromorphic integrated circuit of claim 4 wherein each output computational cell includes:
a decoding circuit that converts an analog signal generated from analog signals input to the output computational cell by one or more computational cells of the neuromorphic integrated circuit to an external signal that is output to an entity external to neuromorphic integrated circuit.

10. The neuromorphic integrated circuit of claim 9 wherein the external signal is a digital, packet-based signal.

11. The neuromorphic integrated circuit of claim 2 wherein computational cells further include habituative-transmission-gate cells.

12. The neuromorphic integrated circuit of claim 11 wherein each habituative-transmission-gate cell interconnects two computational cells using signals lines within the integrated-circuit layer of the neuromorphic integrated circuit, applying a multiplicative gain to an input signal to produce an output signal.

13. The neuromorphic integrated circuit of claim 11 wherein each habituative-transmission-gate cell implements a model that can be expressed as:

$$\frac{dz_i}{dt} = A(1 - z_i) - Bf[T(y_i)]z_i$$

where
- $z_i$ is gain applied by the habituative transmitter gate to an input signal;
- t is time;
- $y_i$ is input to habituative transmitter gate;
- T is a rectification function;
- $f([T(y_i)])$ is a non-linear function of the rectified input; and
- A and B are constants.

14. The neuromorphic integrated circuit of claim 11 wherein two or more computational cells are combined together to produce modules, including:
dipoles;
surrounds; and
laminar cortical-circuit subunits.

15. The neuromorphic integrated circuit of claim 11 wherein computational cells are organized into hierarchical layers, the cells of each hierarchical layer intercommunicating through a nanowire-interconnect layer corresponding to the hierarchical layer.

* * * * *

UNITED STATES PATENT AND TRADEMARK OFFICE
CERTIFICATE OF CORRECTION

PATENT NO. : 8,332,340 B2
APPLICATION NO. : 12/743781
DATED : December 11, 2012
INVENTOR(S) : Gregory S. Snider It is certified that error appears in the above-identified patent and that said Letters Patent is hereby corrected as shown below:

In the Claims:

In column 19, line 17, in Claim 6, delete "$f_i(x4_j)$" and insert -- $f_j(x_j)$ --, therefor.

Signed and Sealed this
Thirtieth Day of July, 2013

Teresa Stanek Rea
*Acting Director of the United States Patent and Trademark Office*